(12) United States Patent
Johnson

(10) Patent No.: US 9,058,560 B2
(45) Date of Patent: Jun. 16, 2015

(54) METHODS, APPARATUS AND SYSTEMS FOR GENERATING, UPDATING AND EXECUTING AN INVASIVE SPECIES CONTROL PLAN

(75) Inventor: Jerome Dale Johnson, Waterville, MN (US)

(73) Assignee: Superior Edge, Inc., Mankato, MN (US)

(*) Notice: Subject to any disclaimer, the term of this patent is extended or adjusted under 35 U.S.C. 154(b) by 595 days.

(21) Appl. No.: 13/372,451

(22) Filed: Feb. 13, 2012

(65) Prior Publication Data
US 2012/0210644 A1  Aug. 23, 2012

Related U.S. Application Data

(60) Provisional application No. 61/443,855, filed on Feb. 17, 2011.

(51) Int. Cl.
| G06N 5/02 | (2006.01) |
|---|---|
| A01G 1/00 | (2006.01) |
| A01G 7/00 | (2006.01) |
| G06N 3/02 | (2006.01) |
| G06N 3/12 | (2006.01) |
| G06F 17/30 | (2006.01) |

(52) U.S. Cl.
CPC *G06N 5/02* (2013.01); *G06N 3/126* (2013.01); *A01G 1/001* (2013.01); *A01G 7/00* (2013.01); *G06F 17/30463* (2013.01); *G06N 3/02* (2013.01)

(58) Field of Classification Search
None
See application file for complete search history.

(56) References Cited

U.S. PATENT DOCUMENTS

| 4,371,081 A | 2/1983 | Satake |
|---|---|---|
| 5,334,987 A | 8/1994 | Teach |
| 5,361,201 A | 11/1994 | Jost et al. |
| 5,389,781 A | 2/1995 | Beck et al. |
| 5,412,219 A | 5/1995 | Chappelle et al. |
| 5,467,271 A | 11/1995 | Abel et al. |
| 5,689,418 A | 11/1997 | Monson |
| 5,751,576 A | 5/1998 | Monson |
| 5,764,819 A | 6/1998 | Orr et al. |
| 5,841,883 A | 11/1998 | Kono et al. |
| 5,845,229 A | 12/1998 | Rawlins |
| 5,857,174 A | 1/1999 | Dugan |
| 5,878,371 A | 3/1999 | Hale et al. |
| 5,913,915 A | 6/1999 | McQuinn |
| 5,919,242 A | 7/1999 | Greatline et al. |
| 5,927,603 A | 7/1999 | McNabb |

(Continued)

OTHER PUBLICATIONS

Panov, et al., GIS "Invasive Species of the Baltic Sea": on-line module of early-warning system on aquatic invasive species for the Baltic Sea area. Abstracts of the 5th Baltic Sea Science Congress, Sopot, Poland, Jun. 20-24, 2005. pp. 311-312.*

(Continued)

*Primary Examiner* — Wilbert L Starks
(74) *Attorney, Agent, or Firm* — Kinney & Lange, P.A.

(57) ABSTRACT

Invasive species control plans may be automatically generated using vegetation control information received from a variety of sources. Such invasive species control plans may aid vegetation control personnel and professionals when determining an invasive species control strategy, including treatment and restoration, and then guide the implementation of that strategy. Invasive species control plans may include a variety of recommended vegetation control practices and projected outcomes for the implementation of recommended vegetation control management practices.

52 Claims, 21 Drawing Sheets

(56) References Cited

U.S. PATENT DOCUMENTS

| | | |
|---|---|---|
| 5,938,709 A | 8/1999 | Hale et al. |
| 5,999,650 A | 12/1999 | Ligon |
| 6,014,451 A | 1/2000 | Berry et al. |
| 6,078,892 A | 6/2000 | Anderson et al. |
| 6,078,901 A | 6/2000 | Ching |
| 6,108,590 A | 8/2000 | Hergert |
| 6,141,614 A | 10/2000 | Janzen et al. |
| 6,160,902 A | 12/2000 | Dickson et al. |
| 6,178,253 B1 | 1/2001 | Hendrickson et al. |
| 6,178,406 B1 | 1/2001 | Cheetham et al. |
| 6,199,000 B1 | 3/2001 | Keller et al. |
| 6,212,824 B1 | 4/2001 | Orr et al. |
| 6,236,907 B1 | 5/2001 | Hauwiller et al. |
| 6,336,051 B1 | 1/2002 | Pangels et al. |
| 6,336,066 B1 | 1/2002 | Pellenc et al. |
| 6,338,040 B1 | 1/2002 | Buman et al. |
| RE37,574 E | 3/2002 | Rawlins |
| 6,366,681 B1 | 4/2002 | Hutchins |
| 6,401,070 B1 | 6/2002 | McManus et al. |
| 6,466,321 B1 | 10/2002 | Satake et al. |
| 6,529,615 B2 | 3/2003 | Hendrickson et al. |
| 6,549,851 B2 | 4/2003 | Greensides |
| 6,596,996 B1 | 7/2003 | Stone et al. |
| 6,597,991 B1 | 7/2003 | Meron et al. |
| 6,606,542 B2 | 8/2003 | Hauwiller et al. |
| 6,683,970 B1 | 1/2004 | Satake et al. |
| 6,721,453 B1 | 4/2004 | Benson et al. |
| 6,745,184 B1 | 6/2004 | Choi et al. |
| 6,750,898 B1 | 6/2004 | Ishida et al. |
| 6,754,184 B2 | 6/2004 | Miyano et al. |
| 6,813,544 B2 | 11/2004 | Hood et al. |
| 6,928,434 B1 | 8/2005 | Choi et al. |
| 6,957,202 B2 | 10/2005 | Skaanning et al. |
| 6,990,459 B2 | 1/2006 | Schneider |
| 6,999,877 B1 | 2/2006 | Dyer et al. |
| 7,039,592 B1 | 5/2006 | Yegge et al. |
| 7,047,133 B1 | 5/2006 | Dyer et al. |
| 7,050,910 B2 | 5/2006 | Kleemola et al. |
| 7,068,816 B1 | 6/2006 | Knoblauch et al. |
| 7,103,451 B2 | 9/2006 | Seal et al. |
| 7,123,750 B2 | 10/2006 | Lu et al. |
| 7,167,800 B2 | 1/2007 | Faivre et al. |
| 7,184,859 B2 | 2/2007 | Hood et al. |
| 7,184,892 B1 | 2/2007 | Dyer et al. |
| 7,203,667 B2 | 4/2007 | Higgins et al. |
| 7,260,561 B1 | 8/2007 | Heidenreich et al. |
| 7,349,888 B1 | 3/2008 | Heidenreich et al. |
| 7,389,181 B2 | 6/2008 | Meadow et al. |
| 7,412,330 B2 | 8/2008 | Spicer et al. |
| 7,440,901 B1 | 10/2008 | Dlott et al. |
| 7,533,069 B2 | 5/2009 | Fairweather |
| 7,542,958 B1 | 6/2009 | Warren et al. |
| 7,542,960 B2 | 6/2009 | Basak et al. |
| 7,555,472 B2 | 6/2009 | Craig et al. |
| 7,657,124 B2 | 2/2010 | Turner et al. |
| 7,657,469 B1 | 2/2010 | Yegge et al. |
| 7,693,765 B2 | 4/2010 | Dell Orfano |
| 7,725,233 B2 | 5/2010 | Hendrickson et al. |
| 7,801,759 B1 | 9/2010 | Adams et al. |
| 7,844,475 B1 | 11/2010 | Murphy |
| 7,904,332 B1 | 3/2011 | Merkley, Jr. et al. |
| 7,916,898 B2 | 3/2011 | Anderson |
| 7,930,085 B2 | 4/2011 | Anderson et al. |
| 7,991,754 B2 | 8/2011 | Maizel et al. |
| 8,046,280 B2 | 10/2011 | Avey et al. |
| 8,046,306 B2 | 10/2011 | Stinson |
| 8,121,345 B2 | 2/2012 | Jochem et al. |
| 8,135,178 B2 | 3/2012 | Hendrickson et al. |
| 8,160,944 B2 | 4/2012 | Orfano |
| 8,189,877 B2 | 5/2012 | Asner |
| 8,195,473 B2 | 6/2012 | Myr |
| 8,196,030 B1 | 6/2012 | Wang et al. |
| 8,208,680 B2 | 6/2012 | Scharf et al. |
| 8,229,768 B1 | 7/2012 | Hopkins, III |
| 8,229,769 B1 | 7/2012 | Hopkins, III |
| 8,243,997 B2 | 8/2012 | Davis et al. |
| 8,244,563 B2 | 8/2012 | Coon et al. |
| 8,249,926 B2 | 8/2012 | Avey et al. |
| 8,250,481 B2 | 8/2012 | Klaric et al. |
| 8,335,747 B1 | 12/2012 | Roberts |
| 8,346,578 B1 | 1/2013 | Hopkins, III et al. |
| 8,510,195 B2 | 8/2013 | Goslinga et al. |
| 8,527,301 B2 | 9/2013 | McComb et al. |
| 2001/0016053 A1 | 8/2001 | Dickson et al. |
| 2002/0017229 A1 | 2/2002 | Pavon et al. |
| 2002/0178229 A1 | 11/2002 | Sinha et al. |
| 2002/0193928 A1 | 12/2002 | Beck |
| 2003/0018481 A1 | 1/2003 | Zhou et al. |
| 2003/0061075 A1 | 3/2003 | Heckman et al. |
| 2003/0139983 A1 | 7/2003 | Spencer et al. |
| 2003/0220805 A1 | 11/2003 | Hoffman et al. |
| 2004/0006736 A1 | 1/2004 | Kawatani |
| 2004/0021862 A1 | 2/2004 | Panigrahi et al. |
| 2004/0087317 A1 | 5/2004 | Caci |
| 2004/0088330 A1 | 5/2004 | Pickett et al. |
| 2004/0167877 A1 | 8/2004 | Thompson, III |
| 2005/0027572 A1 | 2/2005 | Goshert |
| 2005/0075784 A1 | 4/2005 | Gray et al. |
| 2005/0108343 A1 | 5/2005 | Collet et al. |
| 2005/0149464 A1 | 7/2005 | Nugent |
| 2005/0273253 A1 | 12/2005 | Diekhans et al. |
| 2006/0015360 A1 | 1/2006 | Ochs et al. |
| 2006/0015374 A1 | 1/2006 | Ochs et al. |
| 2006/0025927 A1 | 2/2006 | Hoskinson et al. |
| 2006/0282295 A1 | 12/2006 | McComb et al. |
| 2006/0282467 A1 | 12/2006 | Peterson et al. |
| 2006/0287896 A1 | 12/2006 | McComb et al. |
| 2007/0050382 A1 | 3/2007 | Bugir et al. |
| 2007/0089390 A1 | 4/2007 | Hendrickson et al. |
| 2007/0208511 A1 | 9/2007 | Glenn et al. |
| 2007/0239337 A1 | 10/2007 | Anderson |
| 2008/0022773 A1 | 1/2008 | McKenna et al. |
| 2008/0140431 A1 | 6/2008 | Anderson et al. |
| 2008/0162556 A1 | 7/2008 | McConnell |
| 2008/0195270 A1 | 8/2008 | Diekhans et al. |
| 2008/0215203 A1 | 9/2008 | Dix et al. |
| 2008/0250330 A1 | 10/2008 | Thompson |
| 2009/0024555 A1 | 1/2009 | Rieck et al. |
| 2009/0043714 A1 | 2/2009 | Zhao et al. |
| 2009/0150323 A1 | 6/2009 | Hively |
| 2009/0192956 A1 | 7/2009 | Dejean et al. |
| 2009/0216594 A1 | 8/2009 | Verhey et al. |
| 2009/0240516 A1 | 9/2009 | Palestrant |
| 2009/0322357 A1 | 12/2009 | Beaulieu |
| 2010/0042234 A1 | 2/2010 | May et al. |
| 2010/0268390 A1 | 10/2010 | Anderson |
| 2011/0035059 A1 | 2/2011 | Ersavas |
| 2011/0066337 A1 | 3/2011 | Kormann |
| 2011/0113030 A1 | 5/2011 | Hunter et al. |
| 2011/0137456 A1 | 6/2011 | Koselka et al. |
| 2011/0160994 A1 | 6/2011 | Schmidt et al. |
| 2011/0196710 A1 | 8/2011 | Rao |
| 2011/0276336 A1 | 11/2011 | Sweely |
| 2012/0101634 A1 | 4/2012 | Lindores |
| 2012/0109387 A1 | 5/2012 | Martin et al. |
| 2012/0123817 A1 | 5/2012 | Hohenberger et al. |
| 2012/0143633 A1 | 6/2012 | Salghetti et al. |
| 2013/0013525 A1 | 1/2013 | Dlott et al. |
| 2013/0018586 A1 | 1/2013 | Peterson et al. |
| 2013/0093592 A1 | 4/2013 | Lan et al. |
| 2013/0162390 A1 | 6/2013 | Ersavas et al. |
| 2013/0168327 A1 | 7/2013 | Clark |

OTHER PUBLICATIONS

Taylor, et al., Finding Optimal Control Strategies for Invasive Species: A Density-Structured Model for Spartina Alterniflora, Journal of Applied Ecology, 2004, 41, 2004, pp. 1049-1057.*

* cited by examiner

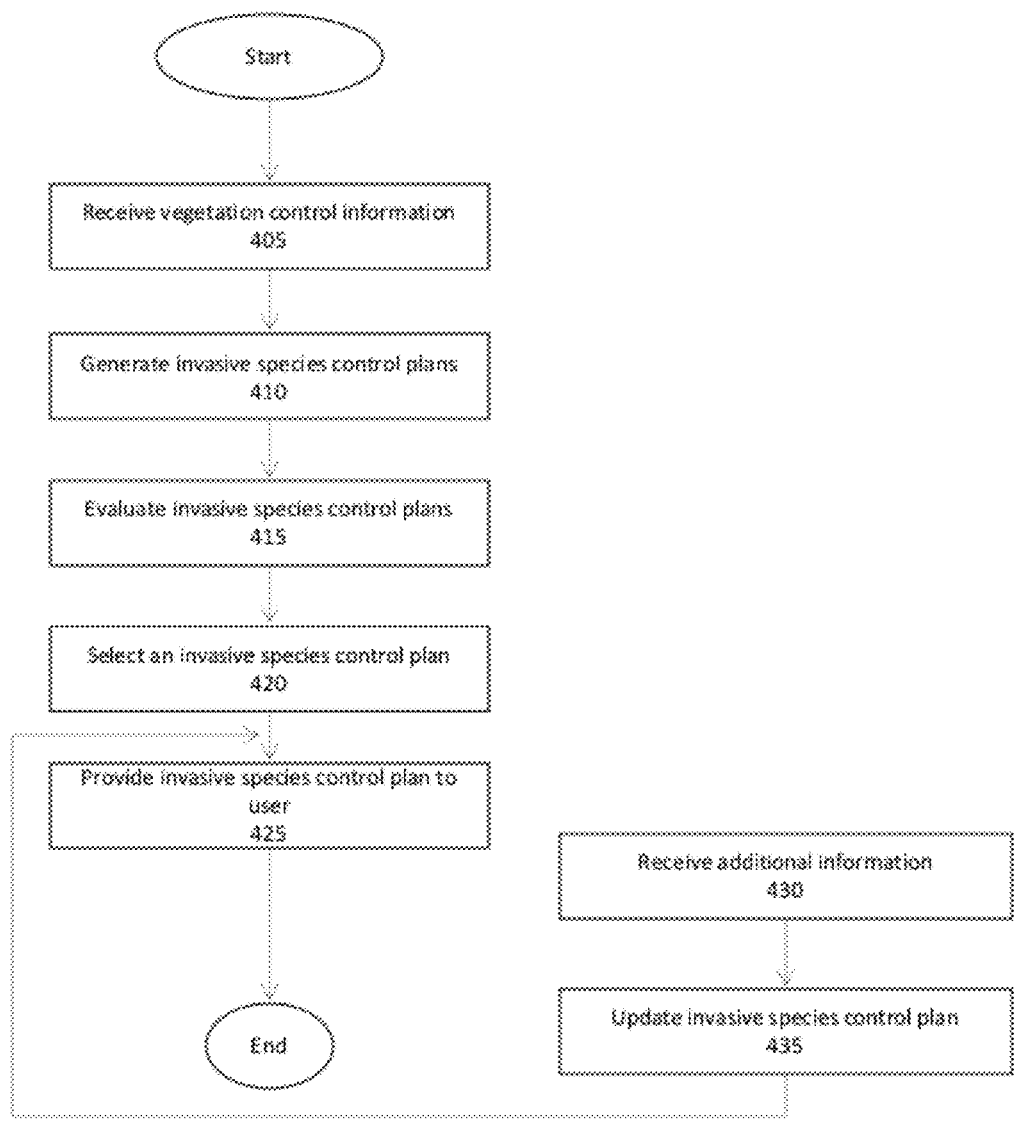

Figure 5    500
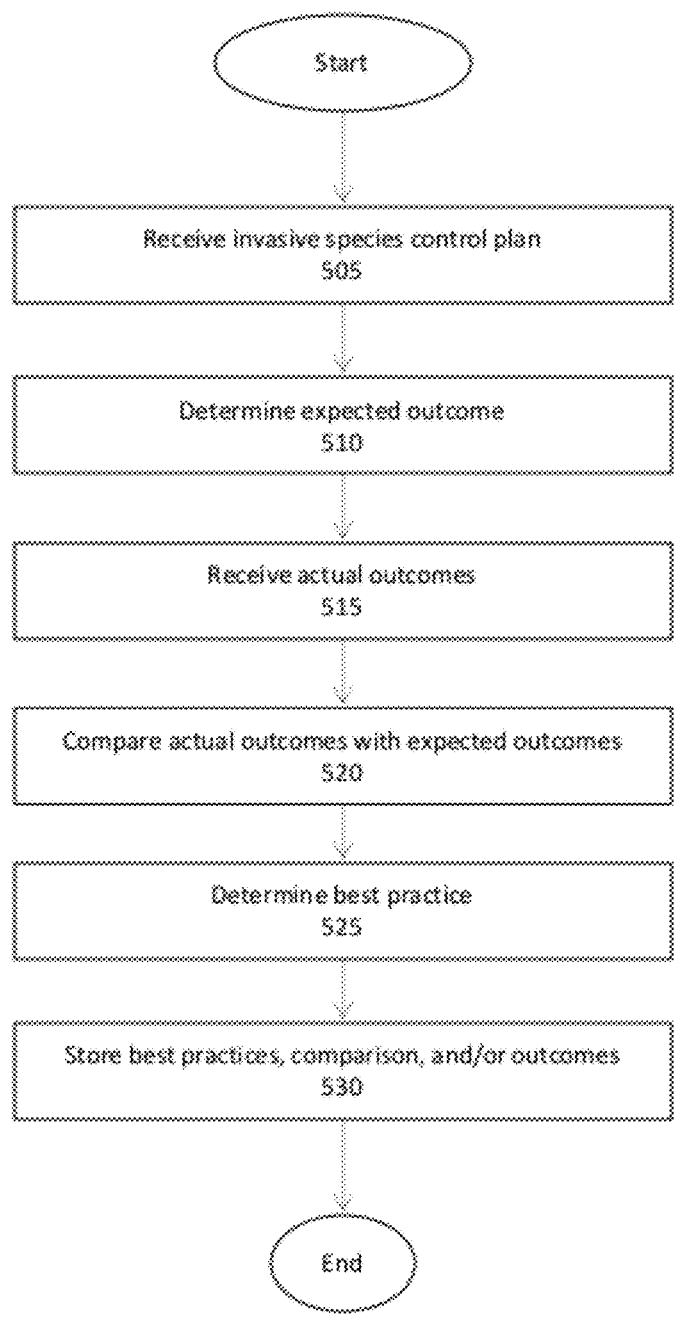

Figure 7     700

Figure 19
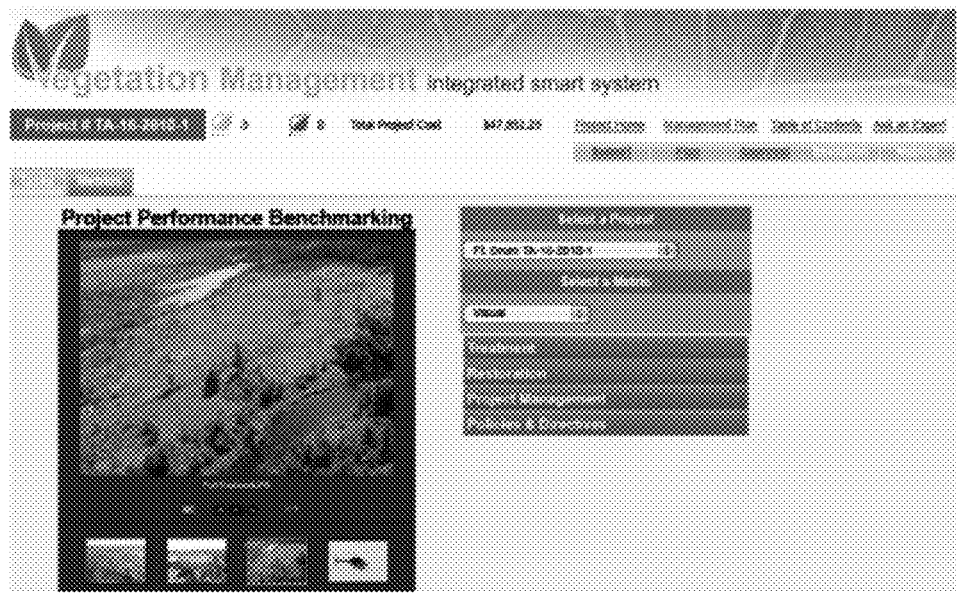

METHODS, APPARATUS AND SYSTEMS FOR GENERATING, UPDATING AND EXECUTING AN INVASIVE SPECIES CONTROL PLAN

RELATED APPLICATIONS

This application is a NONPROVISIONAL of, claims priority to and incorporates by reference U.S. Provisional Patent Application 61/443,855, filed 17 Feb. 2010.

FIELD OF THE INVENTION

The present invention relates to methods, graphical user interfaces (GUI), computer-readable media, and systems for dynamically generating, updating, and executing an invasive species control plan.

BACKGROUND

In recent years, there has been an explosive proliferation of data of all forms and formats related to controlling invasive species. For the purposes of the present invention, invasive species are generally regarded as plant-based vegetation that is classified as invasive or considered undesirable, unnecessary, and/or harmful to the environment in which it is located or to other vegetation, animal, or persons in proximity. The process of controlling invasive species involves a series of actions performed to reduce, remove, and/or prevent from re-growing said invasive species and in some cases restoring the site to some defined state.

The ability to find and then combine the relevant data into a solution to control invasive species and/or restore the impacted site has traditionally been left to the initiative, inventiveness, know-how, and experience of the individual creating the solution. Typically, people creating solutions to invasive species control problems intuitively determine their strategies based on the results of blind interne searches, available resources, past experiences, local knowledge, and opinions. Or, in some instances, a person may hire a consultant or a supplier to assist in the development of a Invasive species control plan. However, these practices often result in outcomes that are less than optimal or even less than may otherwise be achievable because they fail to account for many aspects of invasive species control; including the efficient utilization of resources and available time, financial considerations of the invasive species control plan, logistics (including the organization and movement of equipment, people, and supplies), land characteristics and constraints (including possible environmental and regulatory requirements), neighboring vegetation control issues, and other factors that contribute to optimizing invasive species control and achieving the desired outcomes. In addition, there can be contractual obligations that need to be considered, as well as the wishes and needs of the landlords, landowners, and in some case the neighbors and the public at large.

SUMMARY OF THE INVENTION

The present inventor has recognized that intuitive invasive species control strategies do not leverage the benefits of remote sensing, social networking, and other systems and technologies. Nor do intuitive invasive species control strategies adapt well to unplanned events such as inclement weather, personnel issues, supply shortages, etc. In part, intuitive invasive species control plans suffer because it is difficult for people to modify their habits and practices in the face of broader trends and unplanned events. The present invention addresses these issues by generating, updating, and executing invasive species control plans that take into consideration a variety of such factors by employing technologies not previously exploited to such ends.

Methods, apparatus, and systems for generating, updating, and executing an invasive species control plan are herein discussed. Information regarding the invasive species control plan may be received from a variety of sources, such as a user, a database, a data feed, a social network, a piece of equipment used to execute a portion of the invasive species control plan and/or a remote sensor via a communication network, such as the Internet, a cloud computing network, a local area network (LAN), a wide area network (WAN), or a wireless LAN (WLAN).

The received information may be used to generate one or more invasive species control plans. Invasive species control plans may include, for example, a logistics plan that provides logistical options and instructions for the scheduling, movement, and use of equipment, supplies, people, and resources available for the execution of the invasive species control plan. It may also include site-specific recommendations and instructions, recommended treatments, recommended restorations, maps to aid in execution, recommended resource use, recommended equipment use, supplier data, information regarding supplies required (e.g., biological products, chemicals, seed, fertilizer, fuel, etc.), and recommended activities to be performed. The invasive species control plan may be updated over time and include status information of the portion of the invasive species control plan that has been completed, including data related to budgets, supplies consumed, supply shortages, resource capacity utilization, and accomplishments. In one embodiment, an invasive species control plan may include measures of plan effectiveness and efficiencies.

One or more invasive species control plans may be evaluated by the invasive species control plan generator according to one or more criterion. A preferred invasive species control plan may then be selected by the invasive species control plan generator based upon the evaluation. The selected invasive species control plan may then be provided to the user via, for example, the communication network. In some cases, a plurality of invasive species control plans are selected and provided to the user. In other cases, a portion of an invasive species control plan may be provided to a user, an individual employee, or other designate of the user, or provided directly to the electronic systems of the equipment that is being used to execute all or a portion of the invasive species control plan.

In some instances, additional information regarding the selected invasive species control plan may be received from, for example, the user, the manager, the database, the data feed, the equipment, and/or the remote sensor. The additional information may relate to, for example, new treatment research, site conditions, weather, pricing for the supplies and resources, equipment and personnel availability, operating costs, or status information regarding the progress to that point in executing the plan. The selected invasive species control plan may then be dynamically updated based upon the received additional information and the updated invasive species control plan may be provided to the user via a communication network.

In one embodiment, the received information may relate to an outcome of executing a invasive species control plan and the invasive species control plan generator may determine a best practice for treating invasive species and/or restoring the impacted site based on that outcome. In another embodiment, a best practice may be received from, for example, a scientific researcher, a supplier, or an equipment manufacturer. The invasive species control plan may then be updated according to the best practice.

In another embodiment, the invasive species control plan may include multiple attributes or categories of information, such as site conditions and characteristics, which are determined visually (e.g., by a person in the field) and/or remotely sensed, and site availability and readiness upon which to execute the invasive species control plan. Other included attributes are data related to resources, including equipment, personnel, and supplies, available to execute the invasive species control plan, local knowledge, planned and unplanned events, weather data, supplies and services pricing data, and the like. On some occasions, an attribute of the received information may be determined and the received information may be incorporated into a corresponding attribute of the invasive species control plan. For example, when an attribute of the received information relates to the site's condition, it may be incorporated into a corresponding site condition attribute of the invasive species control plan.

On some occasions, the received information may include remotely sensed data including images of the site to be treated. Such images may be analyzed by, for example, the invasive species control plan generator and the condition of the site and adjacent area may be determined therefrom. A sequence of invasive species control and/or treatment activities based on the determined condition of the area as well as other information may then be incorporated into the invasive species control plan.

In one embodiment, the potential impact of utilizing a particular resource, sequence, treatment or restoration practice, and/or schedule to execute a portion of the invasive species control plan may be determined and a recommendation may be provided to, for example, the user based upon the determined potential impact. The recommendations may include recommendations for one or more of a treatment strategy, treatment products, treatment procedures, a restoration strategy, restoration products and/or species to use in connection with a restoration strategy, and procedures for implementing the restoration strategy.

In some instances, the received information may include climate data, historical weather data, current weather data, and/or predicted weather data and the invasive species control plan may be dynamically updated as current weather data, and predicted weather data is received.

In another embodiment a set of instructions for execution of a portion of the invasive species control plan may be generated and provided to, for example, the user, the manager, the database, the data feed, the remote sensor, the supplier, and/or a piece of equipment utilized to execute a portion of the invasive species control plan. In some instances, the set of instructions may be specific to the user, the manager, the supplier, and/or the piece of equipment utilized to execute all or a portion of the invasive species control plan.

Exemplary systems provided herein include an invasive species control plan generator and a user interface communicatively coupled to one another via a communication network. The invasive species control plan generator may be configured to receive information regarding invasive species control treatment and/or restoration from, for example, a user, a manager, a data feed, a database, equipment, social network, and/or a remote sensor. The invasive species control plan generator may also be configured to generate a plurality of invasive species control plans for treating and controlling invasive species based upon the received information, evaluate the plurality of invasive species control plans according to one or more criterion, select an invasive species control plan responsively to the evaluation, and provide the selected invasive species control plan to a user through the user interface via a communication network.

The user interface may be configured to receive the selected invasive species control plan from the invasive species control plan generator via the communication network, provide the selected invasive species control plan to the user, receive the information regarding invasive species control and/or restoration treatment from the user, and provide the received information regarding invasive species control and/or restoration to the invasive species control plan generator. Optionally, the system may further include a database communicatively coupled to the invasive species control plan generator that is configured to store the received information regarding invasive species control and/or restoration, the plurality of invasive species control plans, and/or the selected invasive species control plan.

BRIEF DESCRIPTION OF THE DRAWINGS

The present application is illustrated by way of example, and not limitation, in the figures of the accompanying drawings, in which:

FIGS. 4A, 4B, and 4C illustrate exemplary processes for generating an invasive species control plan, in accordance with embodiments of the present invention;

FIG. 5 illustrates an exemplary process for determining a best practice for treating and controlling invasive species, in accordance with embodiments of the present invention;

FIGS. 14-19 illustrate various exemplary graphic user interface (GUI) screens that may be used to generate and provide an invasive species control plan to a user who is managing multiple invasive species control and/or restoration projects, in accordance with embodiments of the present invention.

Figure 1:
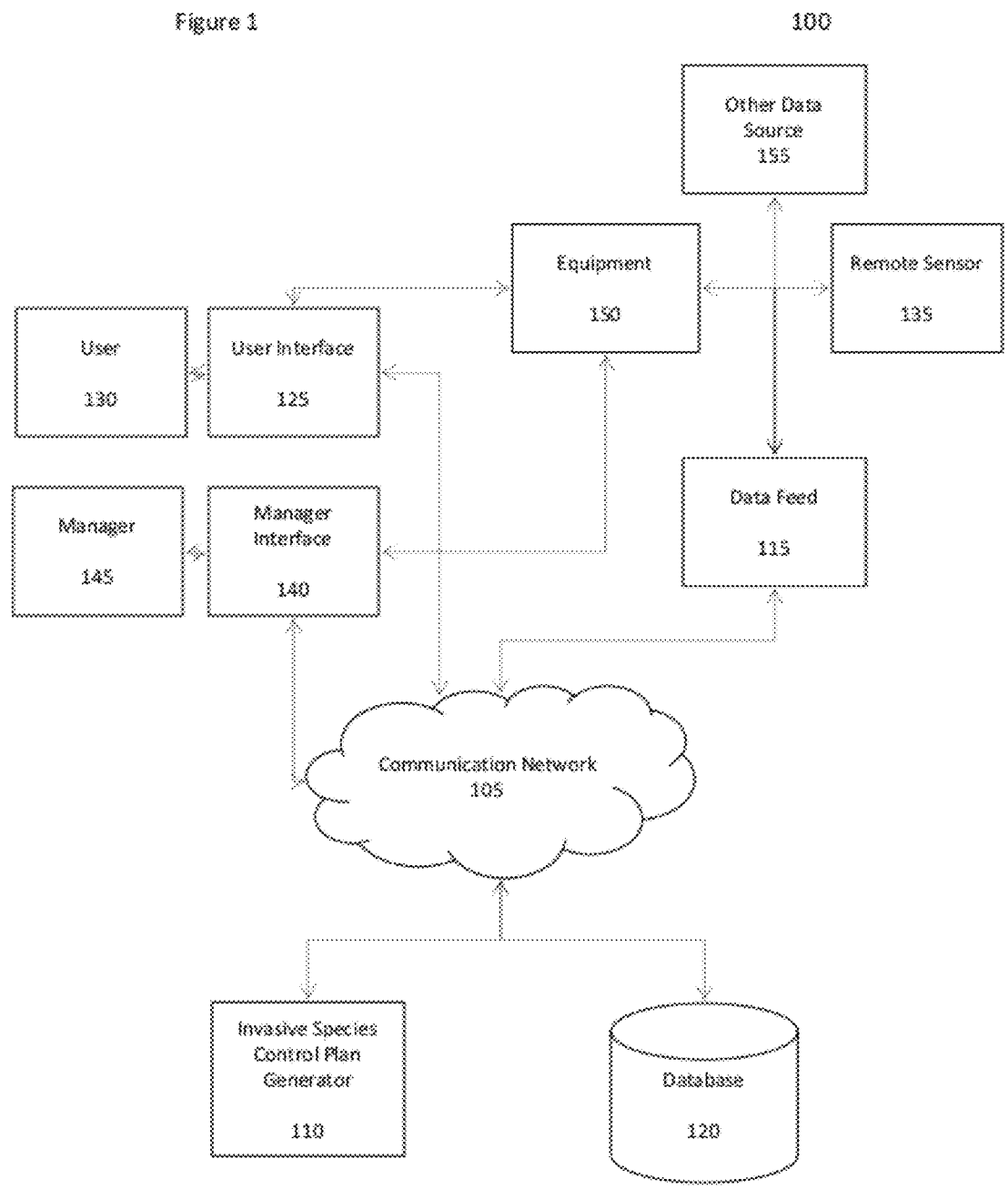
FIG. 1 is a block diagram illustrating an exemplary system having elements configured to design an invasive species control plan, in accordance with embodiments of the present invention.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

The present invention concerns methods and systems which collect, integrate, and process various types of data from various sources to generate an invasive species control plan that may be provided to and used by people engaged in invasive species control operations. Invasive species control plans generated in accordance with the present invention may include a variety of recommended treatment and/or restoration practices and projected outcomes resulting from the implementation of the recommended plan. In some embodiments, a user may be able to manipulate various aspects of an invasive species control plan in order to have the invasive species control plan generator hypothetically predict outcomes for implementation of various control and/or restoration practices. In this way, the user can anticipate the costs and/or impact of implementation of a particular treatment and/or restoration practice prior to its implementation in the "real world." The use of such "what-if" scenarios may help the user predict and manage bottlenecks, constraints, and risks associated with various invasive species control strategies and practices. An invasive species control and/or restoration plan (or, simply, invasive species control plan), as the term is used herein, may include a set of processes by which vegetative species (such as invasive or unwanted plants, etc.) is identified and treated and the process may also include a restoration plan to return the site to a defined condition and all of the associated activities related to that process, such as the determination of treatment and control strategies as well as the application of treatments (e.g., chemical, biological, mechanical, etc.) and the implementation of a restoration plan, etc.

In some cases, an invasive species control plan may be designed to include the user's local knowledge or requirements. For example, an invasive species control plan may be designed to incorporate information which is only known at the local level such as the availability or unavailability of a resource, a user-designated preference, or a contractual or regulatory obligation such as legal requirements preventing the use or requiring the use of a specific treatment.

In one embodiment, an invasive species control plan may be broken down or divided into one or more plans that include instructions for executing a portion of the invasive species control plan. On some occasions, a plan may be customized for execution by a particular role or individual such as a manager, employee, group of employees, or supplier that assists a user in the execution of the invasive species control plan. Controlling an invasive species may involve treatments (e.g., with herbicides or other cehmicals), introduction of native species (e.g., restoration), eradication (by manual removal), and other measures.

In one embodiment the invasive species control plan may include a logistics plan that provides options and instructions for the scheduling, movement, and use of equipment, supplies, and resources for the execution of the invasive species control plan.

Turning now to FIG. 1, a block diagram depicting an exemplary system 100 for executing one or more of the processes described herein is illustrated. System 100 includes a communication network 105, which communicatively couples an invasive species control plan generator 110, a data feed 115, a database 120, a user interface 125 (associated with a user 130), a remote sensor 135, a manager interface 140 (associated with a manager 145), one or more pieces of equipment 150 used to execute the plan, and other data source 155. Note, although only one network 105 is shown in the illustration, there may in fact be multiple such networks and internetworks involved and such networks and internetworks are being grouped together for purposes of simplifying the present discussion. Further, in some instances some of the components illustrated in FIG. 1 may be combined or may be absent from instantiations of the present invention. For example, once invasive species control plans have been generated and deployed, user 130 and/or manager 145 may download invasive species control plans to personal computers, tablet computers, smart phones, or other portable computer-based devices, in which case the invasive species control plan information may be self-contained and access to the communications network and other elements of system 100 may not be required until the invasive species control plan or information concerning vegetation control activities needs to be modified or updated. Although only one set of user/manager interfaces is shown, multiple such sets may exist, or a single manager interface may exist in a system which includes multiple user interfaces, and in some cases the manager interface may simply be a user interface which is configured to provide additional or other capabilities not typically associated with the user interface(s). Thus, system 100 in FIG. 1 is best regarded merely as an example of a system in which the present invention finds application.

As indicated, communication network 105 communicatively couples the other elements of system 100 to one another. Exemplary communication networks 105 include cloud computing networks, the Internet, local area networks (LAN), wireless local area networks (WLAN), and wide area networks (WAN). Usually, though not necessarily, user(s) 130 and/or manager(s) 145 may connect to system 100 periodically, either to upload vegetation control information (e.g., invasive species control plan modifications and additions, accomplishments, outcomes, or unplanned events), download new or updated invasive species control plans, review plan implementations, and so on. In some embodiments, multiple users 130 and/or managers 145 may be enabled to communicate with one another via communication network 105 in a manner similar to, for example, a social network and/or social networking information may be used to generate the invasive species control plan. In some embodiments, invasive species control plan generator 110, may reside on a computer-based platform, such as a server or set of servers. Such a server may be a physical server or a virtual machine executing on another hardware platform, however, the precise nature of such a configuration is not critical to the present invention.

Such a server, indeed all of the computer-based systems which are discussed herein, will be generally characterized by one or more processors and associated processing elements and storage devices communicatively interconnected to one another by one or more busses or other communication mechanism for communicating information. Storage within such devices will usually include a main memory, such as a random access memory (RAM) or other dynamic storage device, for storing information and instructions to be executed by the processor(s) and for storing temporary variables or other intermediate information during execution of instructions associated with the creation, updating, provision or other manipulation of invasive species control plans as described herein. Such a computer system will also include some form of read only memory (ROM) or other static storage device for storing static information and instructions for the processor(s). A storage device, such as a hard disk or solid state memory may also be included for storing information and instructions, such as the instructions to compute invasive species control plans as described herein. RAMs, ROMs, hard disks, solid state memories and the like are all examples of tangible computer-readable media, which may be used to store the instructions which comprise the methods for generating and presenting invasive species control plans in accordance with embodiments of the present invention. Execution of such instructions causes the various computer-based elements of system 100 to perform the processes described herein, although in some instances, hard-wired circuitry may be used in place of or in combination with such computer-readable instructions to implement the invention.

To facilitate user interaction, collection of information, and provision of results, the computer systems described herein will typically include some form of a display device, though such a display may not be included with the server, which typically communicates results to a client/manager station (via an associated client/manager interface) rather than presenting same locally. Client/manager stations will also typically include one or more input devices such as keyboards and/or mice (or similar input devices) for communicating information and command selections to the local station(s) and/or server(s).

To facilitate the network communications alluded to above, the various computer devices associated with system 100 typically include a communication interface that provides a two-way data communication path. For example, such communication interfaces may be Ethernet or other modems to provide a wired data communication connection or a wireless communication interface for communication via one or more wireless communication protocols. In any such implementation, the communication interface will send and receive electrical, electromagnetic, or optical signals which carry digital data streams representing various types of information. This facilitates the exchange of data, including invasive species control plans, through network(s) 105 as described herein.

Invasive species control plan generator 110 may be configured to generate an invasive species control plan by receiving input from user 130, data feed 115, manager 145, remote sensor 135, equipment 150, other data source 155, and/or accessing data stored in database 120. Data feed 115 may provide remotely gathered data relating to, for example, vegetation characteristics, weather, climate, geological data and events (e.g., thunderstorms, floods, etc.), cost of supplies, cost of resources, and satellite imaging data. Data feed 115 may be provided by, for example, various public (e.g., the U.S. Department of Agriculture or National Oceanic and Atmospheric Administration) or private sources and may be so provided on a fee-based or fee-free basis. On some occasions, a data feed may be associated with a system used by a supplier. On some occasions, data feed 115 may be provided by a social networking service (e.g., Twitter, Facebook). In this way, one or more users may communicate information between one another that may be relevant to an invasive species control plan.

Exemplary remote sensors 135 include drones, aircrafts, satellites, and/or physical sensors to measure, for example, moisture levels and site conditions for one or more sites included within an invasive species control plan. In some embodiments, remote sensors 135 may include remotely controlled drones, manned or unmanned aircrafts, or vehicles that remotely sense or gather vegetation control information, such as the impacted area's condition, size of the area, the stage of plant development and/or information concerning the larger area in proximity to the targeted site.

Database 120 may be one or a series of databases linked together and in communication with invasive species control plan generator 110. Database 120 may store data related to any facet of the invasive species control and/or restoration process including, for example, plant identification and characteristics (e.g., growth characteristics, existing research, etc.), budget information, site location, including size and shape, soil characteristics, animal habitats, species potentially impacted, resource availability or utilization, unplanned events (e.g., weather, equipment breakdowns, illness, and other personnel issues, etc.), local knowledge (e.g., user preferences, user contractual obligations, and historical outcomes, etc.), regulatory requirements, and planned invasive species control events (e.g., personnel availability, controlled burns, and scheduled treatment applications, etc.). Further details regarding the information stored in database 120 are discussed below with regard to FIG. 2.

Generating an invasive species control plan can involve the user 130 manually selecting or entering, for example, various preferences (e.g., starting date, targeted end date, starting locations, etc.), contractual obligations, legal, and other regulatory requirements, end use considerations for the area, land data (e.g., visually determined conditions, features, site entry points, etc.), equipment type and conditions, transportation and relocation considerations (e.g., weight constraints, etc.), employee considerations, and/or local knowledge that may be incorporated into an invasive species control plan. On some occasions, manually selected preferences and other user-entered information may be stored in database 120.

In some embodiments, a user may enter local knowledge (e.g., preferences) or requirements into invasive species control plan generator 110 for incorporation into an invasive species control plan. For example, a user may enter a period of time in which a particular resource is available or details of a required supply including its delivery and site entry points which may be incorporated into the invasive species control plan by invasive species control plan generator 110. Alternatively, invasive species control plans may be generated in a partially or wholly automated manner by invasive species control plan generator 110 analyzing, for example, historical, real-time, or known data relating to invasive species control. For example, invasive species control plan generator 110 may automatically include consideration of historically known climate conditions (e.g., average temperature or rainfall, etc.) for a geographic location when generating a invasive species control plan. Of course, many other forms of invasive species control plans can be generated, and such plans may include any type of data related to invasive species control and/or restoration.

Once the invasive species control plan is generated, invasive species control plan generator 110 provides information about the invasive species control plan to user 130. This may be done in a variety of ways, including through the use of an e-mail and/or a message relayed via a messaging system accessible through communication network 105 that includes hyperlinks to a portal at which details regarding the invasive species control plan are available. Other forms of communication, such as an instant message or a text message sent via short message service (SMS) to a user's or operator's mobile phone, or an automated phone call placed by the invasive species control plan generator 110, may also be used to, for example, indicate an invasive species control plan has been updated or an unplanned event has occurred. In FIG. 1, user interface 125 is meant to represent any device via which user 130 can be provided with information regarding the invasive species control plan. Exemplary interfaces 125 include computer systems, equipment interfaces as may be provided by, for example, a tractor, sprayer, aircraft and/or other equipment, mobile computing devices (including but not limited to so-called "smart phones"), televisions, tablet computing devices, and portable computing devices.

In some embodiments, one or more managers 145 may be enabled to access a invasive species control plan via manager interface 140 communicatively coupled to network 105. Manager interface 140 may be similar to user interface 125 and, on some occasions, may be resident on a piece of equipment 150 used to execute the treatment or restoration process.

Managers 145 may manage and monitor the activities of any number of employees and/or pieces of equipment and the deployment of resources in the execution of a invasive species control plan. Exemplary managers 145 include employees, managers, owners, equipment operators, suppliers, consultants, regulators, and others who assist user 130 in the determining, updating, and/or executing an invasive species control plan.

Invasive species control plan generator 110 may use historical invasive species control information in order to, for example, determine stage of plant development for the invasive species, determine a period or number of growing degree days required for the invasive species to mature and/or determine the point at which the treatment plan is the least risky (lesser opportunity of producing unintended results) and would best produce the desired and intended outcomes. These determinations may be used to create the invasive species control plan, including making product recommendations as well as predictions for outcomes.

In some embodiments, one or more pieces of equipment 150 will serve multiple functions, including for example, as an input device for the user 130 or the manager 145 to request generation and/or modification of plans, as an output device for the system to control the activity of the equipment according to the invasive species control plan generator's 110 instructions, for example controlling application rates and steering or flying the equipment, and as a status device reporting progress, activities, and outcomes.

Generating invasive species control plans may include modifying previously selected or recommended plans. For example, the invasive species control plan generator may be configured to update or modify a selected invasive species control plan according and responsive to information concerning other vegetation control projects, weather, newly identified species at the site, new product data, new research data, new best practices information, unplanned events, and new regulatory information. Examples of such instances are described further below.

Figure 2:
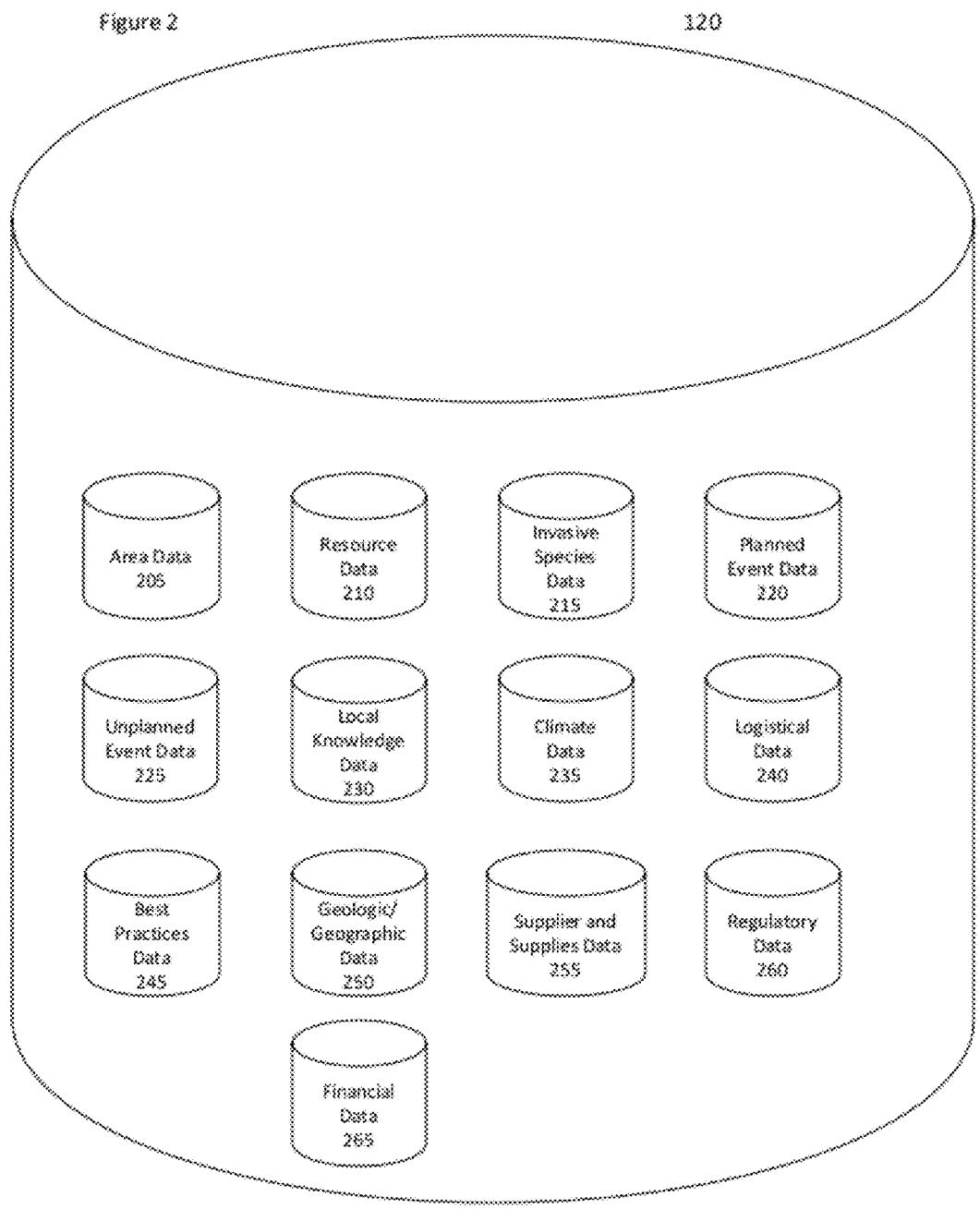
FIG. 2 is a block diagram illustrating exemplary invasive species control and/or restoration data, in accordance with embodiments of the present invention.

FIG. 2 is a block diagram depicting exemplary sets of data or databases that may be included in database 120. For example, database 120 may include area data 205, resource data 210, invasive species data 215, planned events data 220, unplanned events data 225, local knowledge data 230, climate data 235, logistical data 240, best practices data 245, geologic/geographic data 250, supplier and supplies data 255, regulatory data 260, and/or financial data 265. Information stored in database 120 may be received from, for example, a user, such as user 130, a data feed, such as data feed 115, a manager, such as manager 145, a piece of equipment, such as equipment 150, a remote sensor, such as remote sensor 135 via a communication network, such as communication network 105, and/or combinations of the foregoing.

Area data 205 may include information regarding, for example, target site locations, the shape of the site, the proximity of the target site to other relevant locations, and the target area's characteristics, such as topographical information, soil type, other vegetation on site, organic matter, animal life, moisture capacity, and fertility. In addition, area data 205 may include historical experiences of invasive species control projects, observations, and outcomes.

Resource data 210 may include information regarding, for example, resources available for treating invasive species and for the post-treatment restoration of the land. Exemplary resource data may include equipment data (capacities, costs, fuel consumption), personnel data (skills, availability, wages and benefits), and vehicle data (capacities, costs, fuel consumption).

Invasive species data 215 may include information regarding plant characteristics, including, but not limited to, growing degree day requirements, water requirements, nutrient requirements, date, time, and other data related to the germination and development of the invasive species, and disease, chemical, pest or weather vulnerabilities for that type of vegetative species.

Planned event data 220 may include information regarding planned events preceding, during and/or following completion of an invasive species control plan. Exemplary planned events may relate to activities such as scouting events, scheduled aerial data gathering events, treatment events, and field preparation events. Other planned events relate to planned downtime for equipment, planned time-off for personnel, and other events that can be anticipated and planned for.

Unplanned events data 225 may include information relating to unplanned or dynamically changing events that may affect the invasive species control plan, such as weather or geologic events, equipment breakdowns or unavailability as well as the unplanned addition of supplementary tools and equipment, unplanned cost changes, personnel issues, supplier issues, and changing availability of supplies. Other unplanned events are events that cannot be anticipated at the time of the creation of the invasive species control plan and occur during the execution of the invasive species control plan and impact outcomes and activities.

Local knowledge data 230 may include information relating to knowledge or preferences specific to a user and may include, for example, preferred practices, preferred starting point and invasive species control and/or restoration sequences, preferred scheduling, site-specific knowledge, and past experience. On some occasions, local knowledge data 230 may be used to override or modify an aspect of an invasive species control plan in a manner similar to application of a rule to the invasive species control plan generation process. On some occasions, local knowledge data 230 may include data received via a social network. Alternatively or in addition, such data may include contractual requirements, special supplier instructions, or special landlord or owner requirements, for example, the invasive species must be treated organically and all treatments must be completed before a specific date.

Climate data 235 may include information relating to weather and/or climate for a particular region, area, or site.

Logistical data 240 may include information relating to the logistics of executing a invasive species control plan, such as movement of people, equipment, and supplies to and from the treatment or restoration area, including routes, schedules, and special instructions.

Best practices data 245 may include information relating to known or determined best practices for treating an invasive species and/or other vegetation control issues, such as steps to follow in the event of the presence of an endangered species. Best practices data may be determined from analysis of, for example, local invasive species control processes, invasive species control plans, actual invasive species control outcomes, recommendations of and/or restrictions imposed by, for example, governmental agencies or distributors of supplies or equipment and/or a comparison of expected invasive species control results and actual invasive species control outcomes. On some occasions, best practices data 245 may include data received via a social network or culled from one or more Internet-based sources (e.g., blogs, forums, and the like).

Geographic/geologic data 250 may include geographic and/or geologic data related to, for example, areas upon which invasive species are growing, and roads to move supplies, equipment, and people. Exemplary geographic or geologic data may include roadway, surface and/or underground water, and landmark locations. Geographic/geologic data 250 may be derived from a variety of sources, such as satellite images, global positioning information, historical information regarding an area of land, plat book service providers, non-governmental organizations, and public and private organizations and agencies.

Supplier and supplies data 255 may include supplies data (stock keeping units (SKUs), as well as their capabilities and usage specifications, quantities, locations, prices, etc.) and supplier data (names, locations, services, contractual information, etc.), as well as delivery and/or application instructions, dates and terms for products used in connection with invasive species control plans.

Regulatory data 260 may include data that relates to site-specific regulations regarding the use of specific products, rates, practices, or other regulatory requirements.

Financial data 265 may include data that relates to the costs of particular treatment and post-treatment restoration plans, funds available through various public and private organizations in the form of grants, loans, gifts, etc., and the costs of delaying the invasive species control plan.

Figure 3:
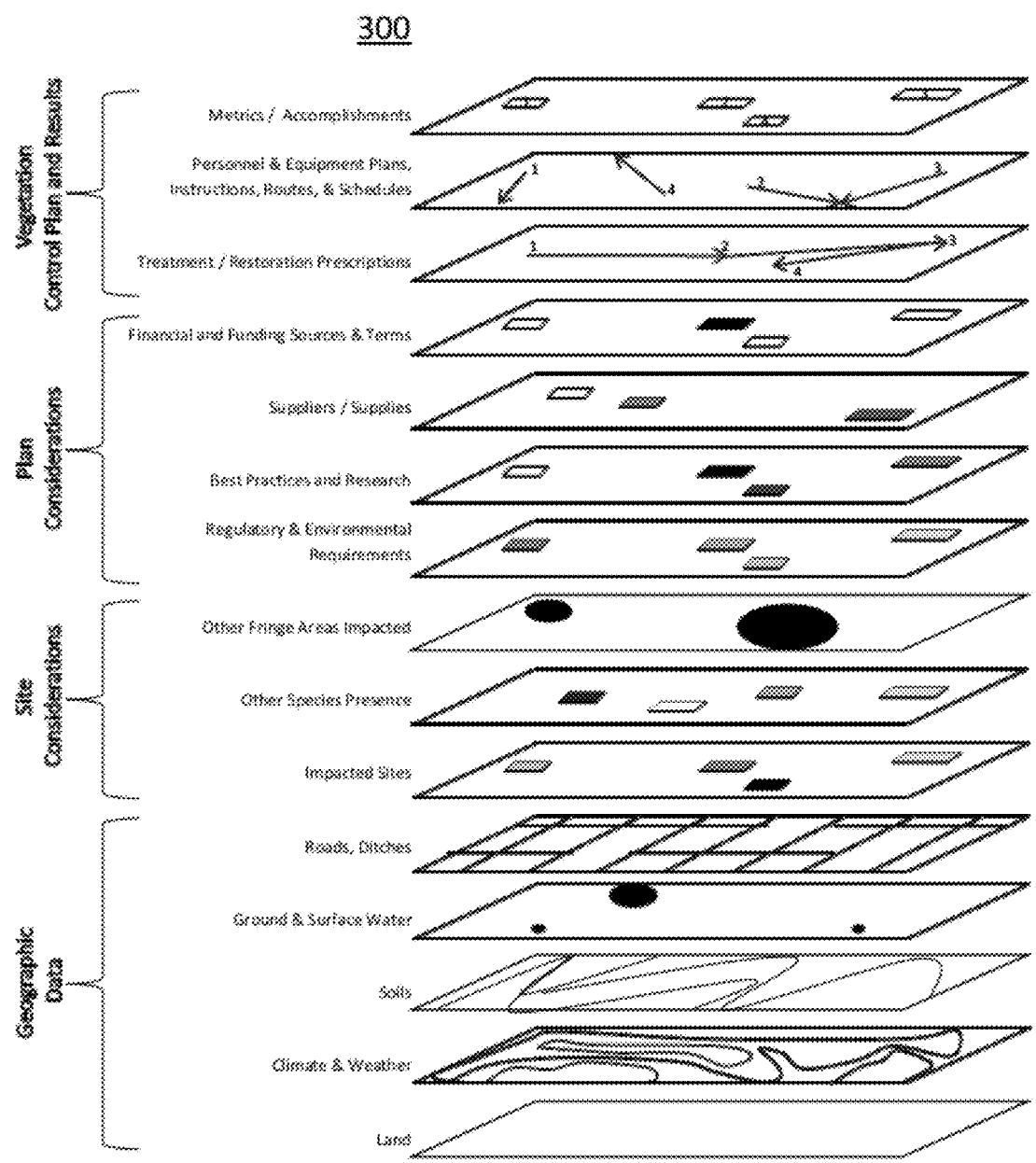
FIG. 3 depicts an exemplary diagram of layered geographic and/or geologic data for an area of land, in accordance with embodiments of the present invention.

On some occasions, the geographic and/or geologic data 250 may be part of a geographic information system (GIS), an example of which is illustrated in FIG. 3. As shown, a GIS 300 includes various data structures, each of which may be regarded as a layer. These layers provide information regarding various data elements of an invasive species control plan, including, for example, geographic data, historical data, and treatment application data. Exemplary geographic data may include, for example, information related to an area of land (the target site plus adjacent areas) (e.g., size, location, etc.), historical weather and climate information, soil attributes (e.g., soil types, texture, organic matter, fertility, etc.), presence and location of ground and surface water, and any man-made features upon the land (e.g., buildings, roads, ditches, etc.). Exemplary site considerations may include the location of the impacted sites for the invasive species control plan (e.g., size, shape, location, etc.), the presence and location of other known species in the area, and the characteristics and conditions of adjacent areas to the impacted sites. Exemplary plan considerations may include information related to area regulatory and environmental requirements, known best practices and research, supplier and supplies data, and financial sources and conditions. Exemplary invasive species control plans and results may include treatment and restoration prescriptions, such as information related to chemical, mechanical, and/or biological products to be used on the impacted site, and any other treatments that are recommended, such as controlled burns. This data may include, for example, information related to employee activities (e.g., employee availability and/or expertise, instructions, transportation routes, and treatment schedules), equipment and/or resource information (e.g., availability, capacity, instructions, transportation routes, and/or schedules), and determinations regarding post-treatment restoration plans. Likewise, this data may include metrics, accomplishments, and the best practices determined from the invasive species control plan.

FIG. 4A is a flow chart depicting an exemplary process 400 for generating an invasive species control plan in accordance with an embodiment of the present invention. Process 400 may be executed by the invasive species control plan generator described in connection with FIG. 1 in cooperation with, for example, any of the systems and/or system components disclosed herein.

Figure 7:
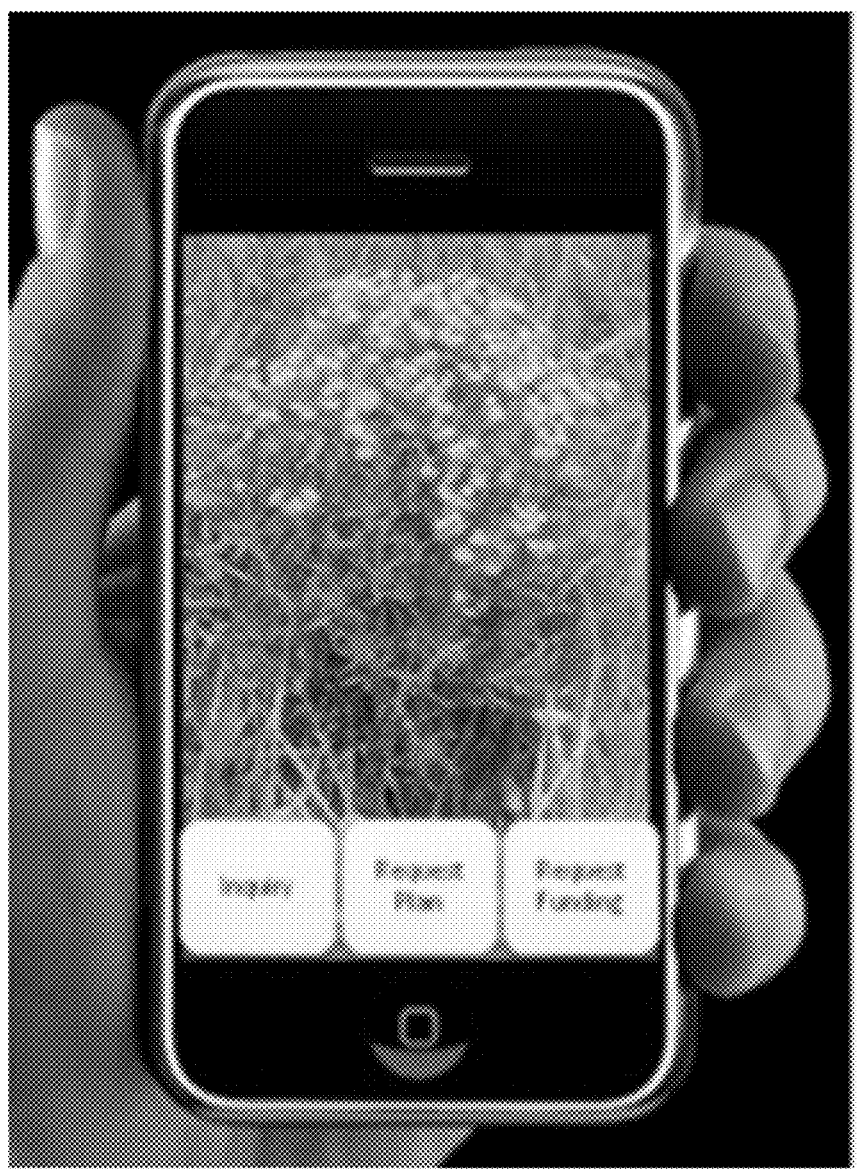
FIGS. 7-13 illustrate various exemplary graphical user interface (GUI) screens that may be used to receive data concerning and to provide an invasive species control plan from/to a user who is managing an invasive species control project, in accordance with embodiments of the present invention.

In step 405, information regarding vegetation control may be received by, for example, an invasive species control plan generator, such as invasive species control plan generator 110 from, for example, a user, such as user 130, a database, such as database 120, a data feed, such as data feed 115, a manager, such as manager 145, equipment, such as equipment 150, another data source, such as other data source 155, and/or a remote sensor, such as remote sensor 135 via a communication network, such as communication network 105 and/or an interface, such as interfaces 125 or 140. Exemplary received information may relate to impacted areas or resources for the invasive species control plan, unwanted species characteristics, planned events, unplanned events, local knowledge, weather or climate, logistics, invasive species control best practices, human resources considerations, and/or geologic/geographic characteristics of impacted areas. On some occasions, the received information may include one or more previously generated invasive species control plans and/or a best practice associated with an aspect of the invasive species control plan. In some embodiments, a user may provide information regarding invasive species control to the invasive species control plan generator via a GUI, an example of which is depicted in FIG. 7.

One or more invasive species control plans may then be generated based upon the received information (step 410). When two or more invasive species control plans are generated, each of the invasive species control plans may be evaluated according to one or more criterion (step 415). Exemplary criterion include overall plan efficiency, utilization of resources, financial and/or temporal costs, risks, the suitability of a treatment practice to a particular site, regulatory requirements, and logistical considerations, including potential bottlenecks and constraints. Then, in step 420, an invasive species control plan may be selected based upon the evaluation and provided to the user via, for example, a communication network (step 425). On some occasions, one or more of the generated invasive species control plans may be provided to the user and, in some instances, the user may select one or more of the invasive species control plans.

In some embodiments, additional information may be received (step 430) following step 425, after the original invasive species control plan has been provided to the user and, as a result, the invasive species control plan may be updated to incorporate the additional information (step 435). For example, in step 430, information regarding a weather event, equipment breakdown, unavailable personnel, animal presence, endangered species presence, supplier or supplies issue, or other conditions may be received and, in step 435, the invasive species control plan may be updated accordingly. The updated plan may then be provided to the user.

Figure 4B:
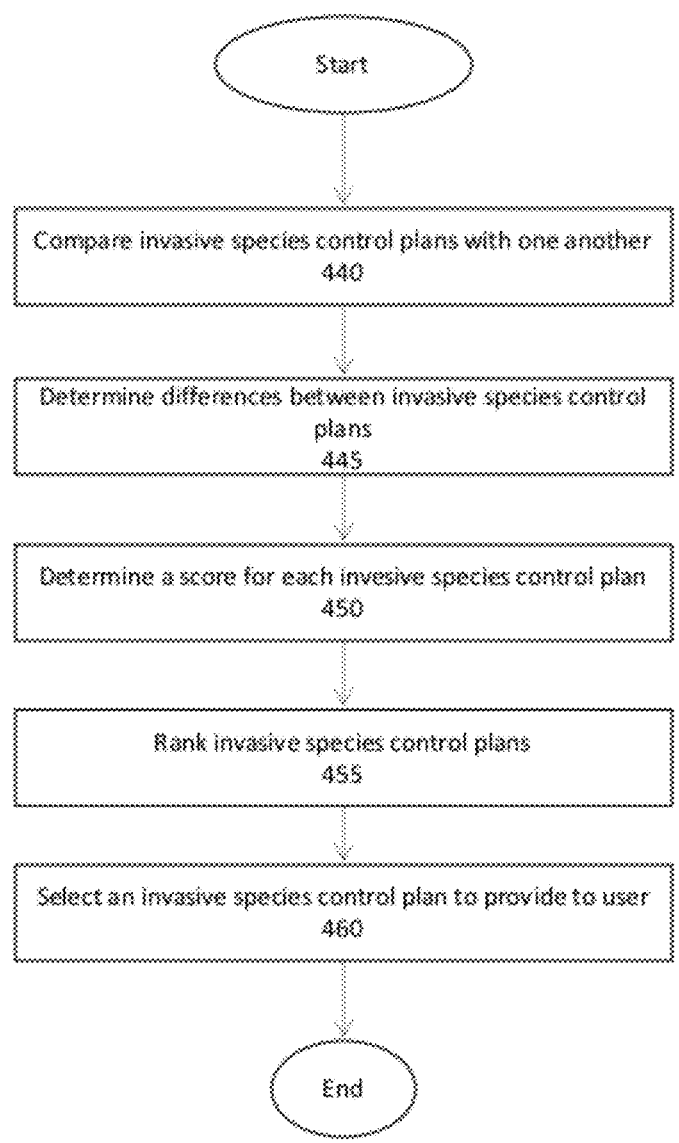

FIG. 4B is a flow chart depicting an exemplary process 401 for evaluating a invasive species control plan as described above with regard to step 415. Process 401 may be executed by the invasive species control plan generator described in connection with FIG. 1 in cooperation with, for example, any of the systems and/or system components disclosed herein.

In step 440, multiple invasive species control plans may be compared with one another and/or compared to benchmarks. In some embodiments, this comparison may include a comparison of corresponding attributes of the two or more invasive species control plans. Differences between the invasive species control plans and/or attributes included therein may then be determined based on the comparison (step 445) and a score for each invasive species control plan may be calculated (step 450). The score may be determined based on costs, treatment effectiveness, complexity/simplicity of the plan, potential environmental impact, potential impact on endangered or other existing species, risks, warranties, funding availability, level of coordination with other invasive species control plans, and other plan variables that can be scored. The scores may be determined by comparing the plan to other plans, a defined benchmark, the plan's objectives, or best practices. In some cases, the score may be an overall score for an invasive species control plan while in other cases sub-scores related to a particular criterion or group of criterions may be determined. The invasive species control plans may then be ranked according to their overall score and/or sub-scores (step 455). One or more invasive species control plans may then be selected for presentation to a user based upon their relative scores or sub-scores (step 460). Following step 460, process 401 may end.

Figure 4C:
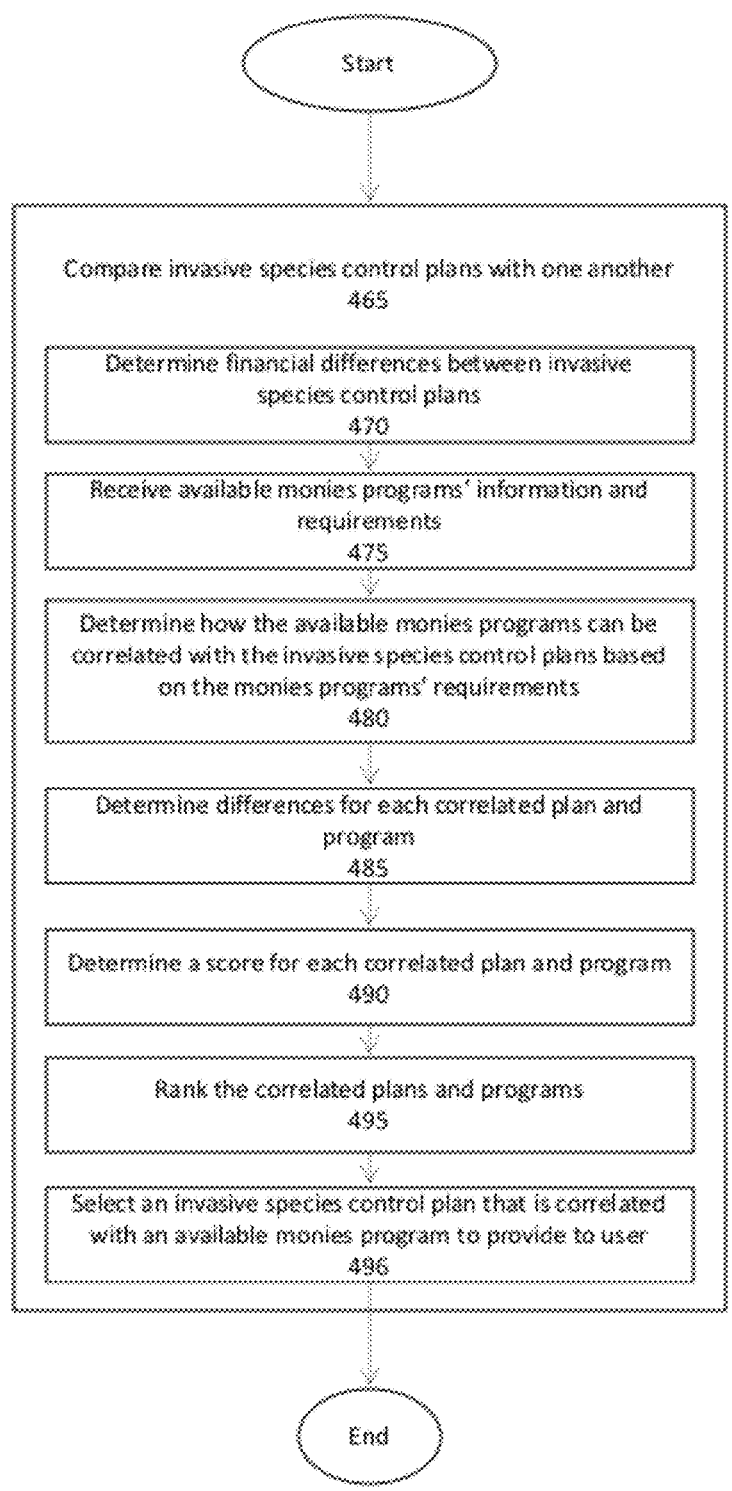

FIG. 4C is a flow chart depicting an exemplary process 402 for evaluating a invasive species control plan in connection with comparisons of various plans as described above with regard to step 445. Process 402 may be executed by the invasive species control plan generator described in connection with FIG. 1 in cooperation with, for example, any of the other systems and/or system components disclosed herein.

In step 465, multiple invasive species control plans may be compared with one another. Such a comparison may involve several sub-steps for each of a variety of attributes. In the following example, financial attributes are discussed, however, the general procedure is applicable to virtually any attribute of an invasive species control plan. Indeed, it is expected that such attribute-by-attribute comparisons will be performed for multiple attributes and the results from each such comparison aggregated to determine an overall most appropriate plan, which can be recommended to the user. Recommendations in a plan may include recommendations for one or more of a treatment strategy, treatment products, treatment procedures, a restoration strategy, restoration products and/or species to use in connection with a restoration strategy, and procedures for implementing the restoration strategy. Alternatively, rather than recommending a particular plan, the invasive species control plan generator may rank the available alternatives (in some cases in connection with a variety of different criteria so as to permit the user to assess the different plans across multiple attribute dimensions) and the ultimate selection may be left to the user(s) as a matter of discretion.

In step 470, the plans under consideration are compared based on differences in their respective financial attributes. In step 475, information concerning various financial incentive programs (e.g., the requirements and terms thereof) is received. In step 480, the specifications for the invasive species control plans are correlated with the available monies programs based on those programs' requirements. In this example, the terms for the program may be considered a benchmark and the invasive species control plan is compared and scored to that plan. Differences between the correlated invasive species control plans available monies programs may then be determined based on the comparison (step 485) and a score for each correlation may be calculated (step 490). In step 495, those correlations are ranked and the selected correlated invasive species control plan and available monies program is provided to the user (step 496).

Consideration of financial implications or incentives for an invasive species control plan is important. In some instances, the present invention provides for automatically completing and submitting an application and documentation for a proposed invasive species control plan to a funding source, or multiple sources and/or to an appropriate regulator, or regulators. In other instances, such action(s) may only be taken upon user authorization. The availability of and approval of funding for a paticular invasive species control plan may influence (even determine) whether such a plan is ultimately proposed by the invasive species control plan generator, so such activities may be performed before a final plan recommendation is made. Or, various alternative plans, some based on the availability of/approval for funding, may be proposed, subject to later review and modification according to funding determinations and information regarding same that is later received by the invasive species control plan generator.

Further, in some instances a selected Invasive species control plan may be updated as one or more of climate data, historical weather data, current weather data, predicted weather data is received, new endangered species data, new product data, new research data, new best practices, and/or new regulatory data is received.

FIG. 5 is a flow chart depicting an exemplary process 500 for determining a best practice for invasive species treatment. Process 500 may be executed by the invasive species control plan generator described in connection with FIG. 1 in cooperation with, for example, any of the systems and/or system components disclosed herein.

In step 505, an invasive species control plan may be received (e.g., retrieved from database 120) and expected results or outcomes for the invasive species control plan may be forecast (step 510). In step 515, information regarding the executed invasive species control plan, such as costs and efficiencies may be received and compared with the forecasted results and outcomes for the invasive species control plan (step 520). A best practice (e.g., one where the expected costs of implementation are minimized while at the same time the expected outcomes of the plan are maximized) may be determined based upon the comparison (step 525) and results of the comparison and/or the determined best practice may be stored in, for example, database 120 (step 530). Plan effectiveness may be evaluated based on the expected degree of eradication of invasive species, minimal impact to desired vegetation, and/or other criteria. Following step 530, process 500 may end.

Figure 6:
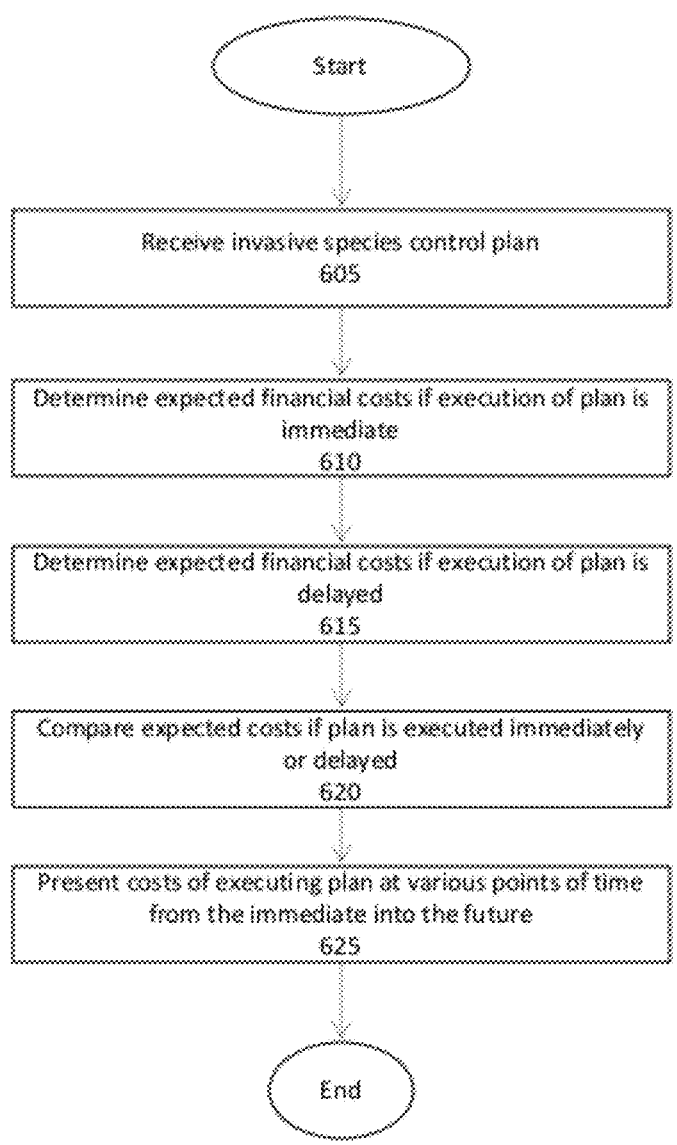
FIG. 6 illustrates an exemplary process for determining and displaying expected financial costs for the execution of an invasive species control plan at various points throughout time.

FIG. 6 is a flow chart depicting an exemplary process 600 for determining the expected costs of executing the invasive species control plan at various points over the passage of time. Process 600 may be executed by the invasive species control plan generator described in connection with FIG. 1 in cooperation with, for example, any of the systems and/or system components disclosed herein.

In step 605, an invasive species control plan may be received and expected financial costs of executing the plan immediately may be determined (step 610). In step 615, the financial costs of executing the plan at a point in the future may be determined. In step 620, the costs of executing the invasive species control plan immediately are compared with the costs of executing the control management plan at a point in the future. In step 625, this comparison is presented to the user to aid in the selection of an execution time. Following step 625, process 600 may end.

FIGS. 7-19 illustrate various aspects of graphical user interface (GUI) screens that may be used to gather and/or present information regarding vegetation control in connection with the generation and provision of an invasive species control plan in accordance with embodiments of the present invention. The GUIs shown in FIGS. 7-19 may be prepared by, for example, invasive species control plan generator 110 and provided to a user, such as user 130 via an interface, such as user interface 125. FIGS. 7-13 illustrate exemplary GUIs that relate to a user who is planning and managing one invasive species control project, and demonstrate the use of a "smart phone" and email correspondence as a user interface 125. FIGS. 14-19 illustrate exemplary GUIs that relate to a user who is planning and managing multiple invasive species control projects, and demonstrate the use of an Internet website as a user interface 125.

FIG. 7 shows an example of the user taking a photo of invasive species with his or her smart phone, which can be considered to be an exemplary user interface 125. The photo can also be taken using a camera or other digital device 125 that is able to present data to the invasive species control plan generator 110. In this example, the user transmits the image, along with other relevant data, such as the size and/or location of the area to be treated, via the communication network 105 to the invasive species control plan generator 110. The invasive species control plan generator 110 may use image recognition or identification techniques along with other information (such as invasive species data 215 from the database 120) to identify the species, or to provide a short list of possible species options to the user from which the user may select the correct plant via the user interface 125. Location information may be provided by location services routinely included in the smart phone" (e.g., which may determine location on the basis of global positioning system or other satellite-based navigation systems and/or cellular service location information) and may be used by the invasive species control plan generator 110 to access geographic/geologic data 250 (e.g., from a GIS included in the database). Such information may assist the invasive species control plan generator 110 in identifying the species of plant depicted in the image and/or may identify the location and possibly the boundaries/shape of the site of the targeted site. The invasive species control plan generator can use the data in the database 120 along with the provided location to determine the area data 205, including soils, slope, and surface and ground water, climate data 235, logistical data 250, and other site-specific information. All of this information is provided to the invasive species control plan generator 110 via the user or manager interfaces 125 and 140 and the communication network 105.

Alternatively, the invasive species and/or site location (including its size and shape) may be determined through the use of a drone or unmanned aircraft which would image the invasive species from the air and determine the location of same using its onboard navigation and camera sensors. Similar imaging and location determination could be performed by ground-based vehicles. Other examples of techniques to identify and locate invasive species may be through visual inspection, manned aircraft or marine vehicles (e.g., in the case of invasive species in lakes, rivers, reservoirs, etc.), satellite imagery, interactive maps, and traditional land surveys.

Figure 8:
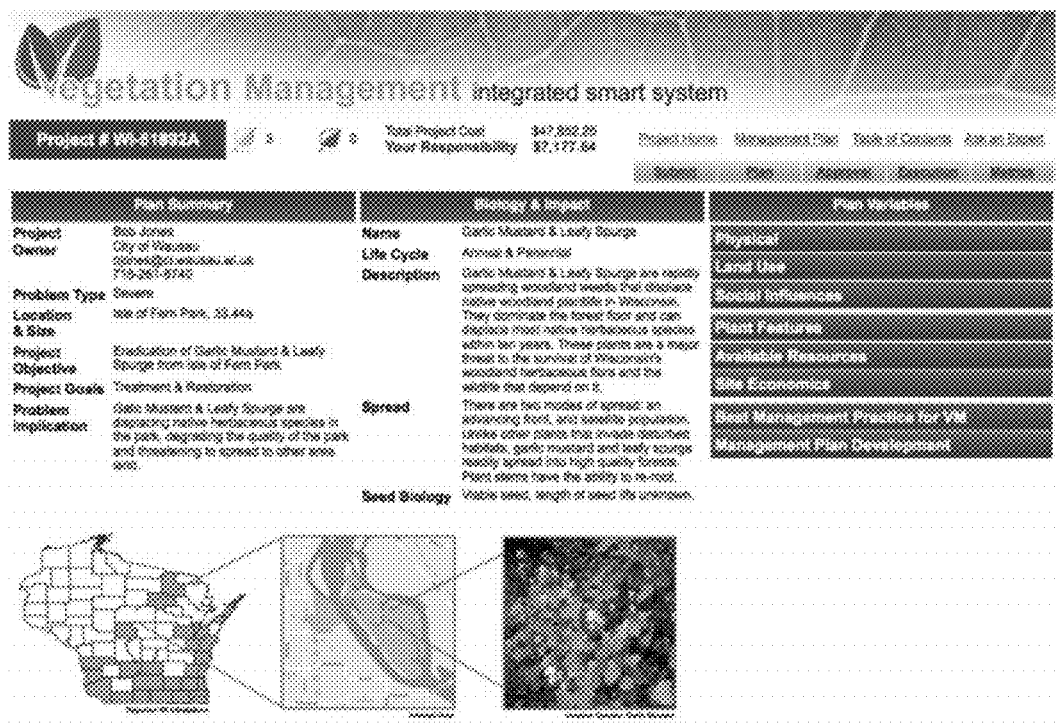

FIG. 8 illustrates an example of an introduction/summary screen 800 for an invasive species control plan generated by the invasive species control plan generator 110. The screen may be presented as a web page (e.g., where the user is accessing the information in a client-server environment) or in another form. Screen 800 provides a user with summary information regarding the plan, the plan's biological impact, and the plan's variables, along with geographic information, plant images, and financial information. The invasive species control plan is identified at the top of the page with its identification tracking number. The plan summary identifies the manager of the plan who is responsible for the plan's execution, the severity and location of the invasive species that the plan will treat, and the plan's objectives and its implications on its location. Exemplary screen 800 also provides details about the problem, including, for example, the invasive species' life cycle, a description of the plant, the main modes by which it spreads, and the it's seed biology. When presented as a web page, the screen may also include Internet links to additional information and visual depictions of the problem the plan will resolve, such as an image of the species. In this embodiment the user will need to advance into the plan to the management plan page (FIG. 9) to get more details concerning the plan.

Figure 9:
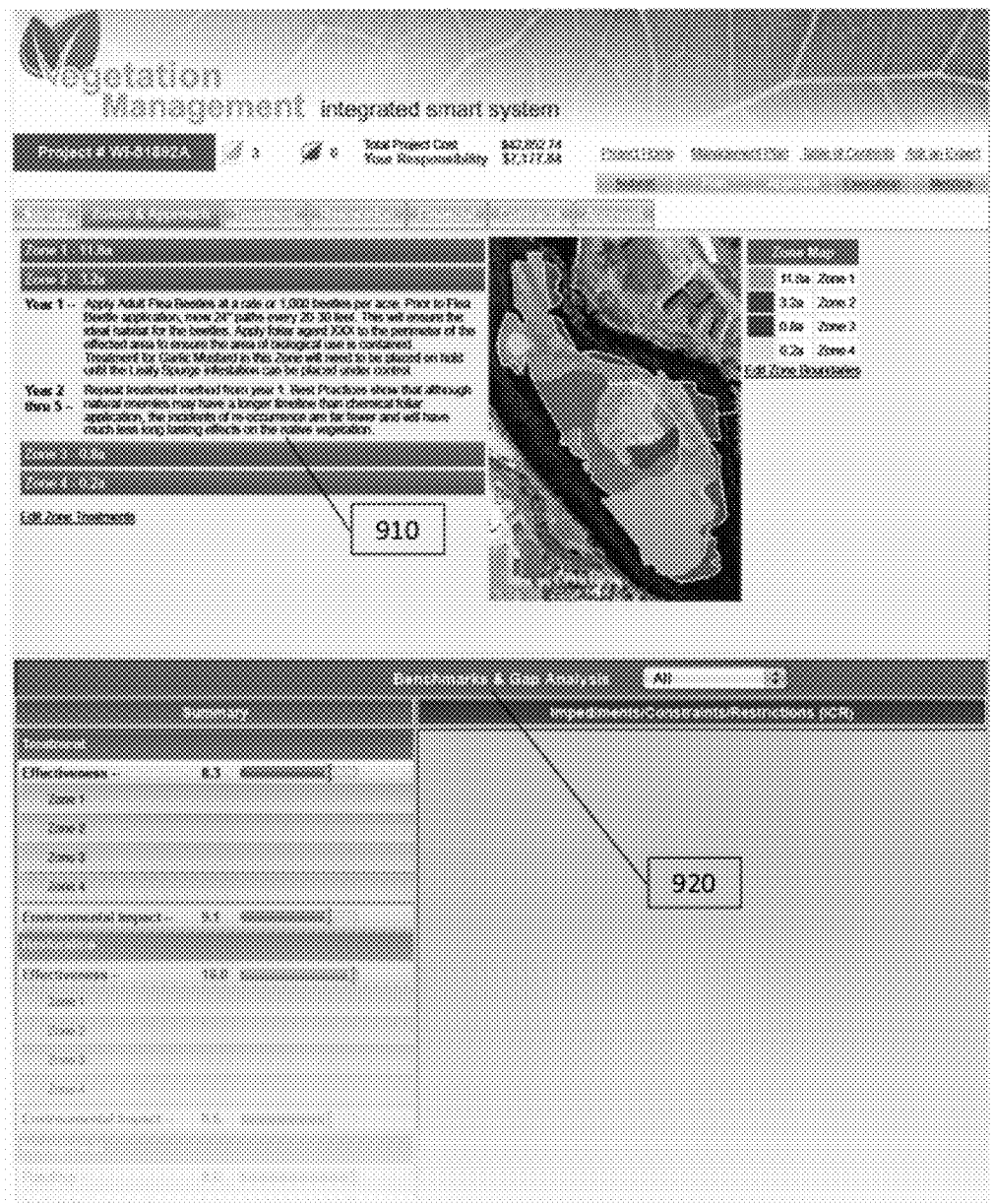

FIG. 9 illustrates an exemplary screen 900 detailing one of the invasive species control plan treatment zones. In this example, Zone 2 is selected and the five-year plan for the zone is described in overview 910. There are four treatment zones suggested for this entire invasive species control plan, which are visually identified on this screen. In this example, the lower portion of the screen provides key project benchmarking and analysis 920 that provides scores for the planned treatment and restoration for each treatment zone based on best practices. There is also a score for the environmental impact of the treatment and restoration, and any restrictions or warnings are also highlighted (there are none in this example).

Figure 10:
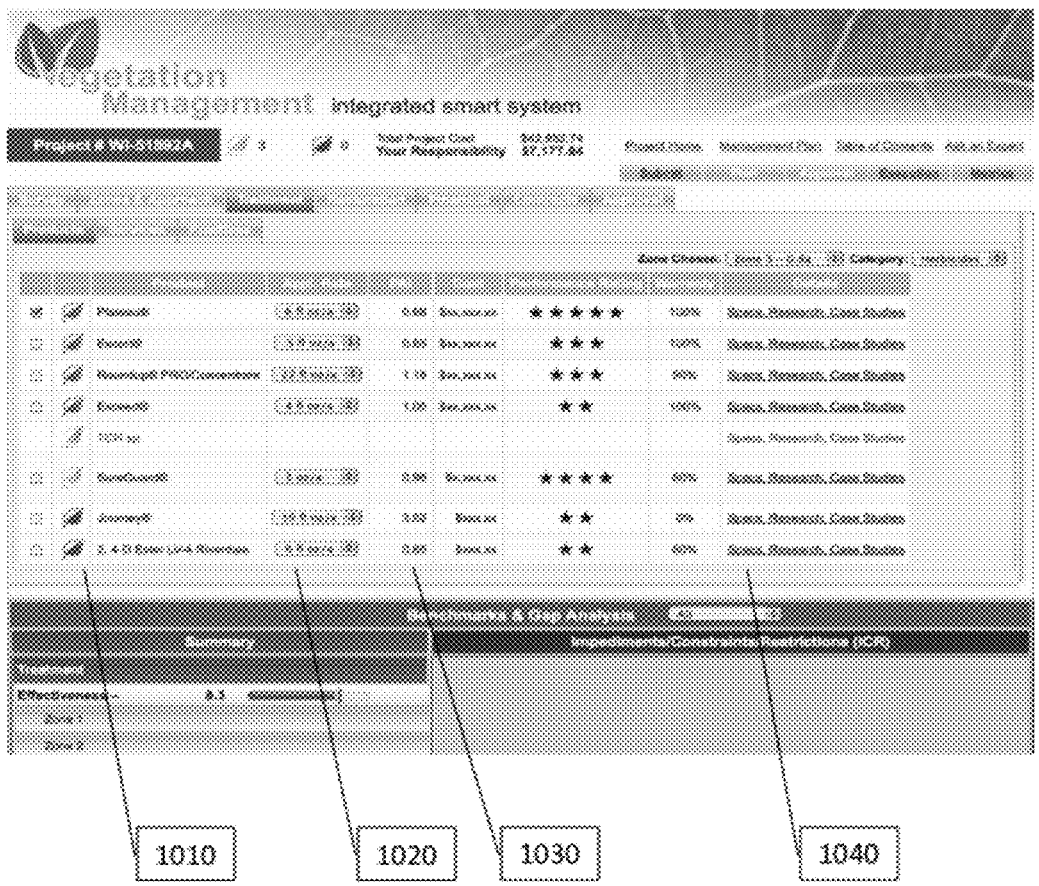

FIG. 10 illustrates an exemplary screen 1000, which presents information concerning possible supplies (treatment products) to be used in connection with a treatment plan and allows for various user selections thereof. In this example, for this specific treatment zone, a chemical approach is recommended by the invasive species control plan generator and accordingly, the invasive species control plan generator 110 provides a list of product options that are available to the manager from which to choose. In some situations several products work comparably well and the manager may want to select an alternate one. In this embodiment the manager can override the recommendation of the invasive species control plan generator and make a selection based on his or her preference or local knowledge. To assist the manager in making the best selection possible and to prevent errors that have unintended consequences, the product options may be categorized using a rating color 1010, such as green—recommended, yellow—marginally acceptable, red—not recommended, gray—unsuitable or unlawful. This exemplary screen 1000 also provides specific details about each product, including the recommended application rates 1020 based on the site characteristics including the soil type among other factors, the pounds of active ingredients (PAI), the costs for each product 1030, the effectiveness score, the warranty, and links to any available product specifications, research, or case studies 1040. The vegetation management plan generator 110 recommends treatment products based on information in its database 120, such as invasive species data 215, climate data 235, area data 205, resource data 210, local knowledge data 230, logistical data 240, best practices 245, geologic/geographic data 250, suppliers data 255, regulatory data 260, and financial data 265.

Figure 11:

FIG. 11 illustrates an exemplary screen 1100 where the user has been granted additional control over the products selected. In this embodiment, the user is allowed to exercise local knowledge to make a selection and the system proactively identifies the potential impacts of that decision. Exemplary screen 800 presents the results of selecting a product that has been rated as not recommended for this particular invasive species problem, color coded as red. The lower portion of the screen provides the reasons that the product was not recommended. In this example, those reasons include the potential for water table contamination and surface water contamination. Although these warnings are provided, the user can override the invasive species control plan generator 110 if he or she desires and select the product that is not recommended through the user or manager interface 125 and 140 in some embodiments the user is not allow to select a non-recommended product (either at all, or in some cases absent manager approval). For example, lock-out controls imposed by invasive species control plan generator 110 may make the selection of non-recommended products impossible. Selecting a product that is not recommended may impact the formerly available monies programs such that they may no longer be available for this plan. In this example, the selections alter the plan's qualifications for specific grants and funding, changing the user's financial responsibility. In the example just described, product selection and qualifications for funding rules are interrelated, and are correlated to the invasive species control plan generator's 110 selection and recommendation of a particular invasive species control plan.

Figure 12:
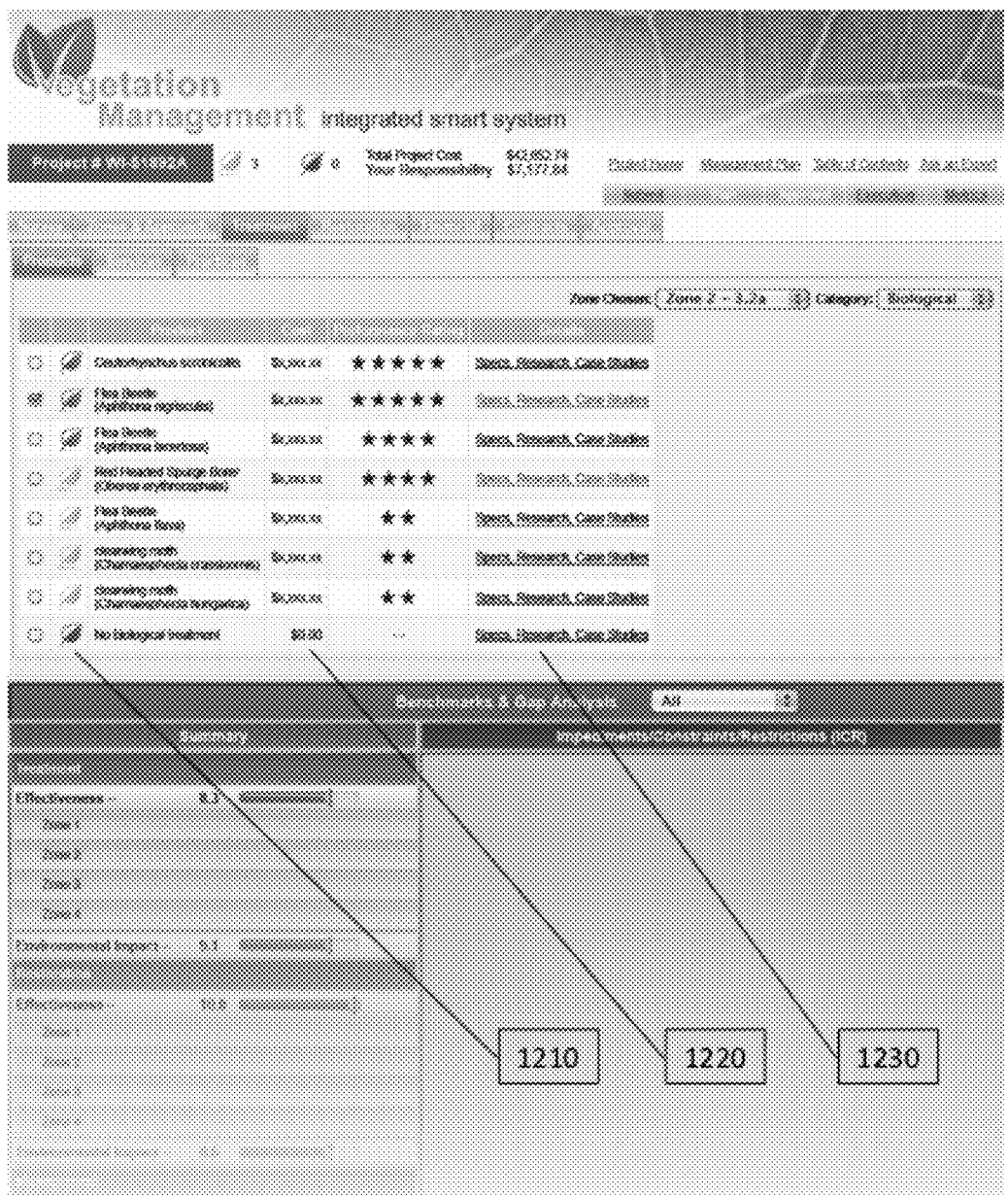

FIG. 12 illustrates an exemplary screen 1200, a biological alternatives product selection page. In this example and within this specific treatment zone, a biological approach (use of insects, etc.) is selected and the invasive species control plan generator 110 provides a list of options/alternative products that are available for the user. The options are given one of four colors as a rating 1210, such as green—recommended, yellow—marginally acceptable, red—not recommended, gray—unsuitable or unlawful. This screen 1200 also provides specific details about each product, the costs for each product 1220, the effectiveness score, and links to any available product specifications, research, or case studies 1230. The invasive species control plan generator 110 recommends treatment products based on information in its database 120, such as invasive species data 215, climate data 235, area data 205, resource data 210, local knowledge data 230, logistical data 240, best practices 245, geologic/geographic data 250, suppliers data 255, regulatory data 260, and financial data 265. The summary section scores the planned treatment and restoration for each treatment zone based on benchmarks and best practices. There is also a score for the environmental impact of the treatment and restoration, and any restrictions or warnings are also highlighted (there are none in this example).

Figure 13:
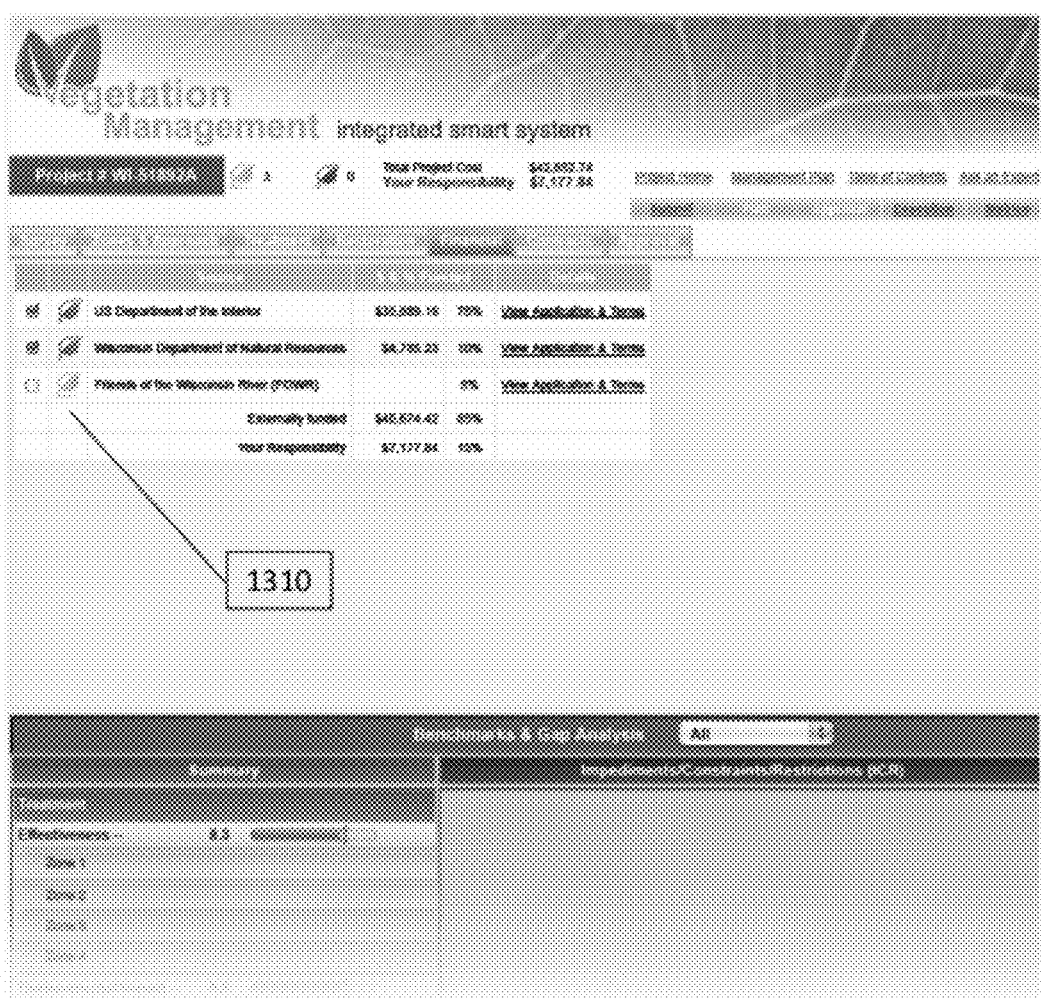

FIG. 13 illustrates an exemplary screen 1300, the funding options selection page. In this example, the invasive species control plan generator 110 provides a list of funding options that are available for the user. The options are given one of four colors as a rating 1310, such as green-recommended, yellow-marginally acceptable, red—not recommended, gray-unsuitable or unlawful. This screen also provides specific details about each option, including the qualifying terms and criteria. The vegetation control system 110 recommends the funding options based on the project description and the program terms among other factors. This screen also provides specific details about each funding source, including the dollar amount available, the percentage this amount makes up of the necessary budget, and links to view the application and its terms. The objective is to identify funding sources, prequalify the plan, and if necessary identify the changes needed to the plan to make it eligible for funding.

Figure 14:
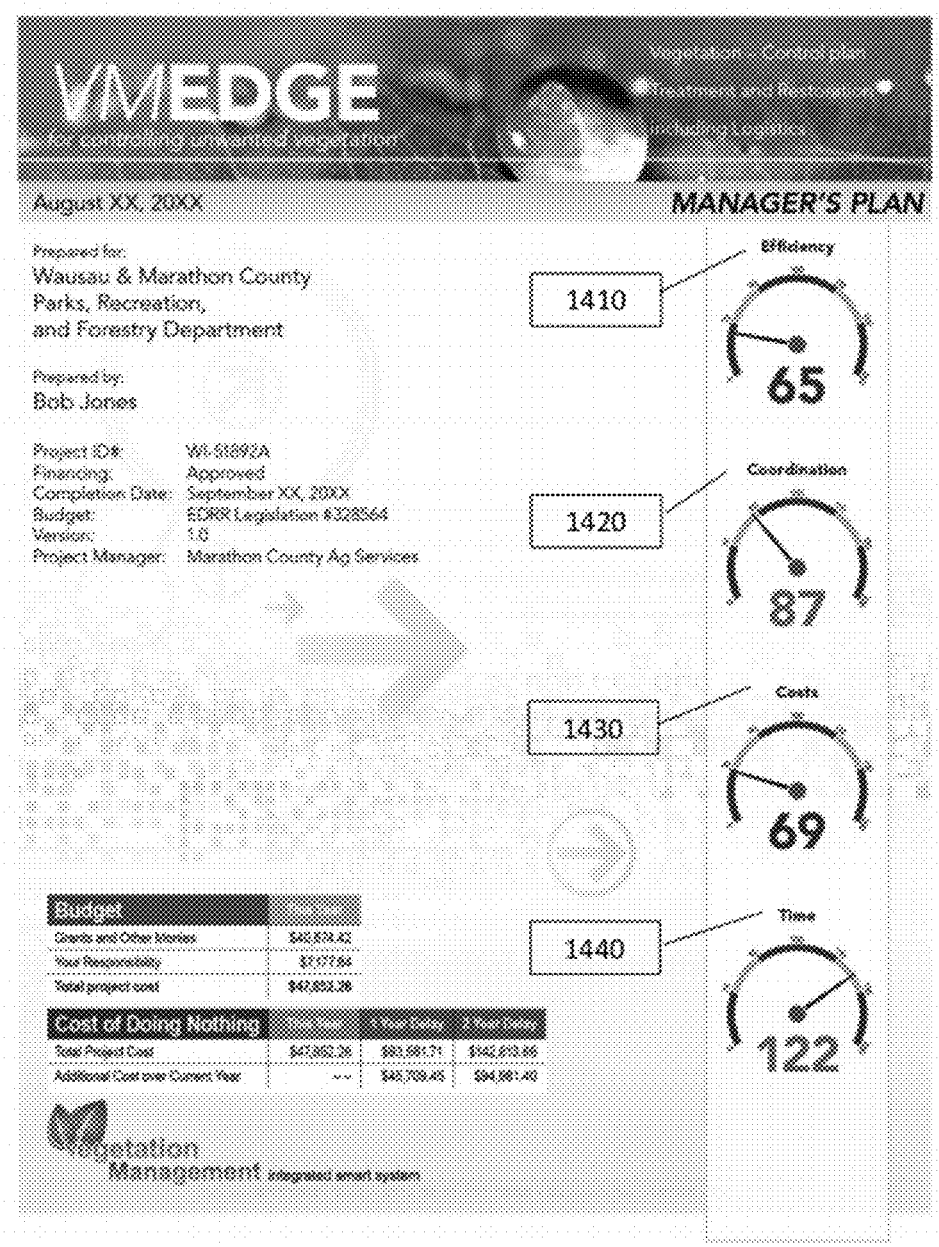

FIG. 14 illustrates an example of a printed plan report 1400, i.e., the cover page thereof, which includes a summary of information regarding a current invasive species control plan. In this example, an efficiency index 1410, a coordination index 1420, a costs index 1430, and a time index 1440 are provided. These indices may indicate a numerical value or score for the actual, estimated, and/or projected performance of an invasive species control plan when executed as compared to a benchmark. The indices can also be used to compare two or more invasive species control plans. In the example provided, indices 1410-1440 are structured and calibrated to calculate a score between 0- 200. The greater the deviation from the benchmark the further the score diverges from a target score of 100. Of course, any method of measurement or presenting measurement results can be used to generate or provide results from these comparisons.

Efficiency index 1410 may provide a score indicating how effectively and efficiently the resources available to the user are utilized in the invasive species control plan as compared to their capacities. A score between 0 and 99 may indicate that resources are being, or will be, used below their capacity. A score between 101 and 200 may indicate that too few resources are being or will be used to execute the invasive species control plan, resulting in resources that are used in excess of their capabilities.

Coordination index 1420 may provide a score indicating the level of coordination between this plan and with other invasive species control plans adjacent to the impacted areas. Coordination index may measure the level of coordinated activities including schedules, communication, treatment methods, restoration methods, costs, funding, as well as other areas of potential coordination which result in improved outcomes and/or reduced risks for the coordinating plans. A score between 0 and 99 may indicate that coordination is below benchmark objectives. A score between 101 and 200 may indicate that coordination is excessive and may result in excessive bureaucratic meetings and delays.

Costs index 1430 may provide a score indicating cost effectiveness of an invasive species control plan. A score between 0 and 99 may indicate that the cost of implementing the plan is, or will be, less than known best practices or targeted costs while a score between 101 and 200 may indicate the opposite.

Time index 1440 may provide a score indicating a comparison of the elapsed time required to start and complete an invasive species control plan as compared to a benchmark, or targeted time period. A score between 0 and 99 may indicate that the time planned or actually required to complete the plan is, or will be, less that the known best practices targets. A score between 101 and 200 may indicate that steps can be taken to reduce the total time required to implement the plan and realize a more preferred score.

Report 1400 is one example of the kind of print materials associated with a plan which are made available through the use of the present methods and systems. Such documents, which are preferably personalized and plan-specific, may be automatically generated based on the plan details. Thus a user is spared the task of having to produce same. In this example, the cover page of the print materials displays the budget, broken down between outside funding and required additional funding, the costs of delaying the project, and an analysis and projected measurements of the outcomes of the plan to be executed. The funding information displays what monies are available through grants and other financing options, the amount of the total budget the user will be responsible for, the total estimated budget for the suggested plan, the estimated costs of delaying the project at 1 and 2 year intervals, with the additional costs of each year of delay displayed. This data is supplied from the invasive species control plan generator's 110 financial data 265 for each selected invasive species control plan. The analysis and measurements illustrate the projected outcomes in the form of indexes.

Figure 15:
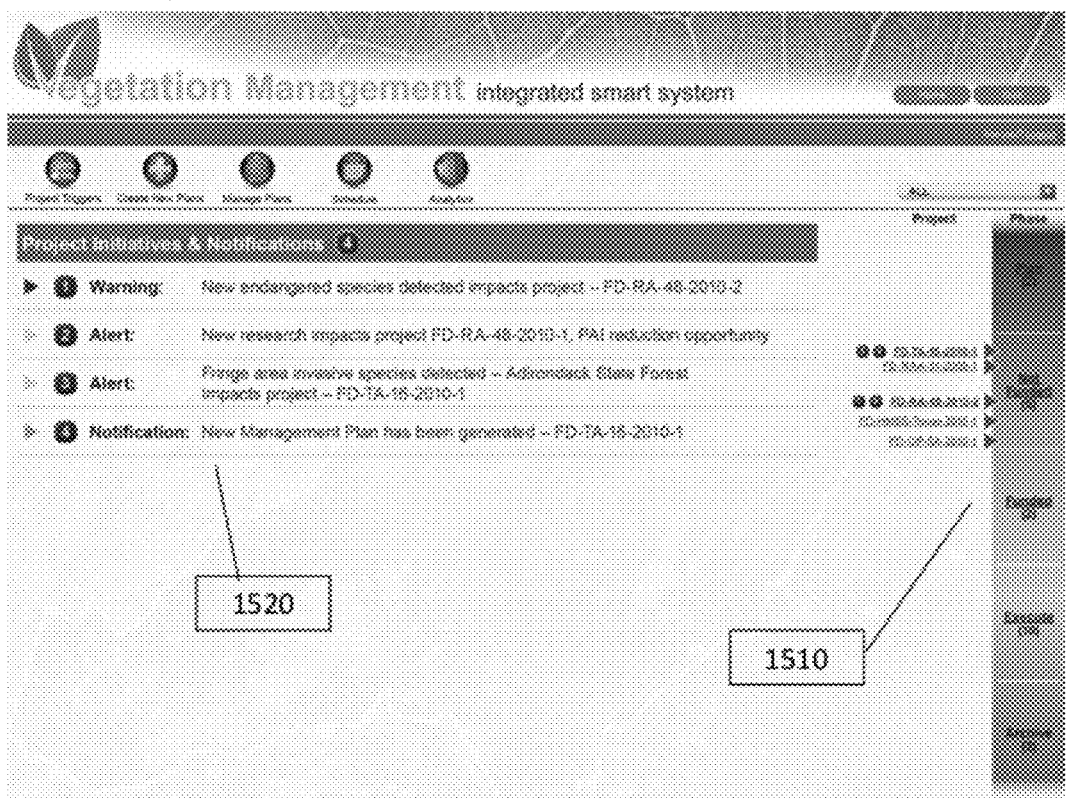

FIG. 15 illustrates an exemplary screen 1500, which may be the home page of a web site that provides access to the invasive species control plan generator 110 for a user who is managing multiple plans. In this embodiment, passwords and usernames are required for access to the invasive species control plan generator, and control the organization, data access, and functionality that are available through the home page. They are also used to direct workflow and authority, and limit access to metrics and data that may be sensitive and confidential to specific roles or users. Users and roles are established and managed in the system administrative modules. In this embodiment, all plans for which the user has responsibility and/or is monitoring are accessed via the menu on the right of the screen 1510. The current phase for each project is shown. Projects can be started, designed, and managed from this screen 1500.

In this example, the user has responsibility for or is monitoring five projects, all of which are currently in various stages of attaining funding. Project initiatives 1520 are displayed on the main body of the screen. New initiatives may arrive daily. A new initiative can be a new project but often an initiative is an update and modification to a project that is already in planning or in some stage of execution, as in the example here. In the example, these initiatives may relate to an endangered species entering into a project site, newly released research, newly released products, newly passed legislation, newly begun fringe area projects, among others. Each of these initiatives represents new data than may impact the project plan and may be used by the invasive species control plan generator to modify the plan in some manner. Project metrics and schedules can be accessed via this screen.

Figure 16:

FIG. 16 illustrates an exemplary screen 1600 of an initiative, showing a warning that impacts a project that is beyond the planning stage and is in its execution phase. In this example, an endangered species has entered into a treatment zone, necessitating modifications to the plan already in progress. This screen also illustrates GIS capabilities. GIS information shows the location of the endangered species and various GIS layers can be displayed. The invasive species control plan generator 110 has automatically determined the recommended changes to the plan due to the entry of the endangered species. After viewing the recommendations, the user can choose to accept, modify, or reject the changes.

Figure 17:
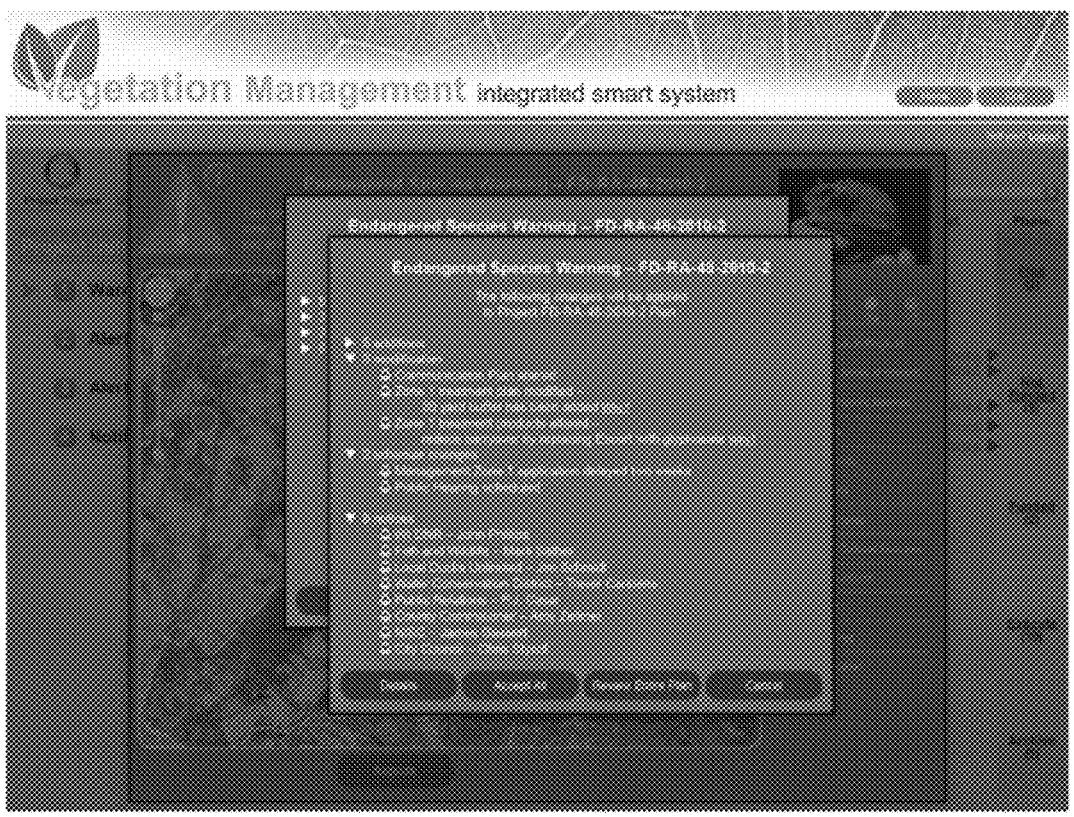

FIG. 17 illustrates an exemplary screen 1700, a warning screen that the invasive species control plan generator 110 displays following the identification of endangered species having entered into a treatment zone that is already in its execution phase. This screen shows the user that there are changes to the plan recommended by the invasive species control plan generator 110. These changes can include 1) additions—new elements to the plan, 2) modifications—changes to current elements, 3) schedule changes—changes resulting from the additions and modifications, and 4) notices—people who need to be informed concerning the changes. The user has the ability to accept, modify, or reject these changes. In this embodiment, the invasive species control plan generator 110 recommends an additional buffer zone, a product with less carryover, changes to the schedule based on the new product, a public hearing, and a list of people to be informed. These recommendations are made based on data including business rules contained in the database 120, potentially derived in part from the generator's best practices data 245. The user has the ability to accept, modify, or reject these changes.

Figure 18:

FIG. 18 illustrates an exemplary screen 1800 of an initiative, showing the impact of an invasive species control project that is beyond the planning stage and is in its execution phase. In this example, an area that is adjacent the current project site has identified its own vegetation control problem, and has developed a plan that impacts this current project, necessitating modifications to the plan already in progress. The invasive species control plan generator 110 has prepared the recommended changes to the plan due to the adjacent area project. In this example, changes may include working together, sharing costs, comparing plans, and the use of products to allow both projects to proceed successfully. After the viewing the recommendations, the user can choose to accept, modify, or reject them.

FIG. 19 illustrates an exemplary screen 1900, which presents a visual/photographic metric of a planned project. The user can select "visual" metrics and view a "before image" or "after image" of the project. These images can be uploaded into the invasive species control plan generator 110 by a user or manager via the user or manager interface 125 and 140 to help manage and track the progress of the project. In the top "before" example, note the drainage and surface water which will impact project design and execution. In the bottom "after" example, note the cemetery in the lower part of the screen next to the lake. This example demonstrates that the invasive species control plan generator 110 takes into account the existence of other land and cultural features.

While the foregoing has described what are considered to be the best mode and/or other examples of the present invention, it is understood that various modifications can be made therein and that the subject matter disclosed herein can be implemented in various forms and examples, and that the teachings can be applied in numerous applications, only some of which have been described herein.

What is claimed is:

1. A method comprising:
receiving, by an invasive species control plan generator, information regarding controlling invasive species from at least one of a user, a database, a data feed, and a remote sensor via a communication network;
automatically generating, by the Invasive species control plan generator, one or more invasive species control plans for controlling invasive species in one or more locations based upon the received information;
automatically evaluating, by the invasive species control plan generator, the one or more invasive species control plans according to one or more criterion;
selecting, by the invasive species control plan generator, one of the generated invasive species control plans responsively to the evaluation;
providing, by the Invasive species control plan generator, the selected invasive species control plan to the user via the communication network;
generating, by the invasive species control plan generator, a set of instructions for execution of a portion of the selected invasive species control plan; and
providing, by the invasive species control plan generator, the set of instructions to at least one of the user, a manager, the database, the data feed, the remote sensor, and a piece of equipment utilized to execute a portion of the selected invasive species control plan.

2. The method of claim 1, further comprising:
receiving, by the invasive species control plan generator, additional information regarding the selected invasive species control plan from at least one of the user, the database, the data feed, and the remote sensor; and
automatically generating an updated version of the selected invasive species control plan based upon the received additional information; and
providing the updated version of the selected invasive species control plan to the user via the communication network.

3. The method of claim 1, further comprising:
receiving, by the invasive species control plan generator, additional information regarding invasive species control plans for projects which are adjacent, regional or relevant to the selected invasive species control plan from at least one of the user, the database, the data feed, and the remote sensor; and automatically generating an updated version of the selected invasive species control plan based upon the received additional information; and providing the updated version of the selected invasive species control plan to the user via the communication network.

4. The method of claim 1, further comprising:

identifying, by the invasive species control plan generator in an automated fashion, opportunities to coordinate activities concerning multiple invasive species control plans for projects which are adjacent, regional, or relevant to an area impacted by the selected invasive species control plan; and generating an updated version of the selected invasive species control plan based upon the received additional information; and providing the updated version of the selected invasive species control plan to the user via the communication network.

5. The method of claim 1, further comprising the invasive species control plan generator automatically generating an updated invasive species control plan based on an attribute of information concerning an attribute of the selected invasive species control plan received subsequent to the selected invasive species control plan being provided.

6. The method of claim 1, wherein the one or more invasive species control plans include multiple attributes, the attributes concerning at least one of a site to execute a subject invasive species control plan, invasive species, resources available to execute the invasive species control plan, a site treatment and restoration strategy and plan, individual resources available to execute the subject invasive species control plan, local knowledge regarding vegetation control, planned events, remotely sensed site conditions, site conditions determined by visual inspection, weather data, and unplanned events.

7. The method of claim 1, wherein each of the one or more invasive species control plans include a logistics plan that provides logistical instructions and options for organizing at least one of resource allocation and resource movement.

8. The method of claim 1, wherein the selected invasive species control plan contains measurements of the plan including at least one of an efficiency index, a coordination index, a time index, and a cost index.

9. The method of claim 1, further comprising:

determining, by the invasive species control plan generator, a status for one or more resources utilized to implement the invasive species control plan; and providing, by the invasive species control plan generator, an alert to the user responsively to the determined status.

10. The method of claim 1, further comprising;

determining, by the invasive species control plan generator in an automated fashion, a potential impact of utilizing a resource to execute a portion of the selected invasive species control plan; and providing, by the invasive species control plan generator, at least one of an analysis and a recommendation based upon the determined potential impact of the utilization to the user.

11. The method of claim 1, further comprising:

determining, by the invasive species control plan generator, a potential impact of utilizing a strategy to execute a portion of a selected invasive species control plan; and providing, by the invasive species control plan generator, at least one of an analysis and a recommendation based upon the determined potential impact of the strategy to the user.

12. The method of claim 1, further comprising determining, by the invasive species control plan generator, at least one of the financial or environmental impact resulting from delaying implementation of the selected invasive species control plan.

13. The method of claim 1, wherein the received information includes at least one of climate data, historical weather data, current weather data, and predicted weather data, the method further comprising updating, by the invasive species control plan generator, the selected invasive species control plan as one or more of climate data, historical weather data, current weather data, and predicted weather data is received.

14. The method of claim 1, wherein the received information includes at least one of newly identified endangered species data, new product data, new research data, new best practices data and new regulatory data, the method further comprising updating, by the invasive species control plan generator, the selected invasive species control plan as one or more of new endangered species data, new product data, new research data, new best practices, and new regulatory data is received.

15. The method of claim 1, wherein the received information includes one or more of information regarding a planned event, an unplanned event, a contractual requirement, a funding requirement, a financial requirement, a plant requirement, a treatment requirement, a restoration requirement, resource utilization, local knowledge, resource availability, remotely sensed information, information received via a resource, and information received via a computer-implemented social network.

16. The method of claim 1, wherein the received information includes an invasive species control plan outcome, the method further comprising:

determining, by the invasive species control plan generator, a best practice for controlling invasive species based on the invasive species control plan outcome; and updating, by the invasive species control plan generator, the selected invasive species control plan responsively to the determined best practice.

17. The method of claim 1, wherein information is received from a piece of equipment utilized to implement at least a portion of the selected invasive species control plan, and said selected invasive species control plan is updated, by the invasive species control plan generator, responsive thereto to reflect consequences of the information received from said equipment.

18. The method of claim 1, wherein the received information includes remotely sensed data relating to the invasive species and a location of a site where the invasive species is located, the method further comprising:

determining, by the invasive species control plan generator in an automated fashion, a size and border of the site containing the invasive species based upon an analysis of the remotely sensed data.

19. The method of claim 1, wherein the received information includes remotely sensed data relating to the invasive species and a location of a site where the invasive species is located, the method further comprising:

determining, by the invasive species control plan generator, a status of the invasive species based upon an analysis of the remotely sensed data.

20. The method of claim 1, wherein providing the selected invasive species control plan includes presenting aspects of the selected invasive species control plan for review by the user in a fashion which demonstrates recommendations for one or more aspects included in the selected invasive species control plan and user modification of some or all of those recommendations.

21. The method of claim 20, wherein the recommendations are designated through the use of coded indicators on a user interface screen.

22. The method of claim 20, wherein the recommendations include recommendations for one or more of a treatment strategy, treatment products, treatment procedures, a restoration strategy, restoration products and/or species to use in connection with a restoration strategy, and procedures for implementing the restoration strategy.

23. The method of claim 20, wherein presenting aspects of the selected invasive species control plan for review by the user includes prohibiting the user from modifying at least some aspects of the selected invasive species control plan.

24. The method of claim 20, wherein presenting aspects of the selected invasive species control plan for review by the user includes presenting a restoration strategy, restoration products, and restoration procedures.

25. The method of claim 24, wherein presenting aspects of the selected invasive species control plan for review by the user includes prohibiting the user from modifying at least some aspects of the selected invasive species control plan.

26. The method of claim 1, further comprising automatically identifying, by the invasive species control plan generator, potential funding sources for which a specific invasive species control plan qualifies.

27. The method of claim 1, further comprising automatically determining and identifying, by the invasive species control plan generator, changes required within a subject invasive species control plan under consideration such that the subject invasive species control plan will qualify for specific funding.

28. The method of claim 1, further comprising automatically completing and submitting an application and documentation for the invasive species control plan to a funding source, or multiple sources.

29. The method of claim 1, further comprising automatically completing and submitting an application and required documentation for the invasive species control plan to an appropriate regulator, or regulators.

30. The method of claim 1, wherein the set of instructions is personalized for at least one of the user, the manager, the database, the data feed, the remote sensor, and the piece of equipment.

31. The method of claim 1, wherein the selected invasive species control plan is provided to another individual for monitoring execution of the selected invasive species control plan.

32. A system comprising:
an invasive species control plan generator configured to receive information regarding vegetation control from a plurality of sources, automatically generate one or more invasive species control plans for controlling invasive species on a site based upon the received information, automatically evaluate the invasive species control plans according to one or more criteria, automatically select one of the invasive species control plans responsively to the evaluation, and automatically provide the selected invasive species control plan to a user via a communication network; and
at least one client communicatively coupled to the invasive species control plan generator via the communication network and configured to receive the selected invasive species control plan and present it to the user; and
wherein the invasive species control plan generator is further configured to automatically prevent the user from specifying deviations from one or more plan attributes.

33. The system of claim 32, wherein the client hosts a user interface configured to receive the selected invasive species control plan from the invasive species control plan generator via the communication network, provide the selected invasive species control plan to the user, receive information regarding vegetation control from the user, and provide the received information regarding vegetation control to the invasive species control plan generator.

34. The system of claim 32, further comprising a database communicatively coupled to the invasive species control plan generator and configured to store at least one of the received information regarding vegetation control, the one or more of invasive species control plans, and the selected invasive species control plan.

35. The system of claim 32, wherein the communication network is at least one of the Internet, a cloud computing network, a local area network (LAN), a wide area network (WAN), or a wireless LAN (WLAN).

36. The system of claim 32, wherein the invasive species control plan generator is further configured to receive additional information relating to a vegetation control outcome and determine a vegetation control best practice based on the received additional information, the system further comprising a database communicatively coupled to the invasive species control plan generator and configured to store the best practice.

37. The system of claim 32, wherein the invasive species control plan generator is further configured to automatically determine best practices for invasive species control plans.

38. The system of claim 32, wherein the received information comprises some or all of: site data, resource data, invasive species data, planned event data, unplanned event data, local knowledge data, climate data, logistics data, best practices data, geologic/geographic data, supplier and supplies data, regulatory data, and financial data.

39. The system of claim 38, wherein the invasive species control plan generator is communicatively coupled to one or more of equipment used in implementing an invasive species control plan, remote sensors, user stations, manager stations, and computer-implemented social networks to receive the information.

40. The system of claim 32, wherein the invasive species control plan generator is further configured to automatically receive data from equipment used in implementing the selected invasive species control plan.

41. The system of claim 32, wherein the invasive species control plan generator is further configured to automatically receive data from remote sensors.

42. The system of claim 32, wherein the invasive species control plan generator is further configured to automatically receive information for generating the invasive species control plans from computer-based social networks.

43. The system of claim 32, wherein the invasive species control plan generator is further configured to update the selected invasive species control plan according and responsive to information concerning other vegetation control projects, weather, newly identified species at the site, new product data, new research data, new best practices information, unplanned events, and new regulatory information.

44. The system of claim 32, wherein the invasive species control plan generator is further configured to provide the user with hypothetical invasive species control plans according to user-supplied criteria.

45. The system of claim 32, wherein the selected invasive species control plan includes some or all of a treatment/control plan and a restoration plan.

46. The system of claim 32, wherein the invasive species control plan generator is further configured to automatically select treatment products based on plant characteristics, site characteristics, and regulatory requirements.

47. The system of claim 32, wherein the invasive species control plan generator is further configured to automatically identify potential funding sources as part of generating the Invasive species control plans.

48. The system of claim 32, wherein the invasive species control plan generator is further configured to automatically qualify the invasive species control plans for potential funding sources.

49. The system of claim 32, wherein the invasive species control plan generator is further configured to automatically generate documentation for funding sources.

50. The system of claim 32, wherein the invasive species control plan generator is further configured to automatically complete and submit documentation for regulatory requirements.

51. The system of claim 32, wherein the invasive species control plan generator is further configured to automatically pass instructions to equipment used in implementing the selected invasive species control plan.

52. A system comprising:
  an invasive species control plan generator configured to receive information regarding vegetation control from a plurality of sources, automatically generate one or more invasive species control plans for controlling invasive species on a site based upon the received information, automatically evaluate the invasive species control plans according to one or more criteria, automatically select one of the invasive species control plans responsively to the evaluation, and automatically provide the selected invasive species control plan to a user via a communication network; and
  at least one client communicatively coupled to the invasive species control plan generator via the communication network and configured to receive the selected invasive species control plan and present it to the user; and
  wherein the invasive species control plan generator is further configured to automatically generate a set of instructions to execute at least a part of the plan, said instructions personalized for people and equipment executing the selected invasive species control plan.

* * * * *